(12) United States Patent
Takahashi et al.

(10) Patent No.: US 9,150,690 B2
(45) Date of Patent: Oct. 6, 2015

(54) METHOD FOR PRODUCING POLYLACTIC ACID BLOCK COPOLYMER

(75) Inventors: Yoshitake Takahashi, Aichi (JP); Takuma Naotsuka, Aichi (JP); Ken Sudo, Aichi (JP); Hiroyuki Ome, Aichi (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 13/819,199

(22) PCT Filed: Jun. 27, 2011

(86) PCT No.: PCT/JP2011/064629
§ 371 (c)(1),
(2), (4) Date: Feb. 26, 2013

(87) PCT Pub. No.: WO2012/029392
PCT Pub. Date: Mar. 8, 2012

(65) Prior Publication Data
US 2013/0158209 A1    Jun. 20, 2013

(30) Foreign Application Priority Data

Aug. 31, 2010 (JP) ................. 2010-193119
Jan. 27, 2011 (JP) ................. 2011-014879
Mar. 30, 2011 (JP) ................. 2011-075313

(51) Int. Cl.
| | |
|---|---|
| *C08G 63/80* | (2006.01) |
| *C08L 67/04* | (2006.01) |
| *C08G 63/06* | (2006.01) |
| *C08G 63/82* | (2006.01) |
| *C08G 63/08* | (2006.01) |
| *C08G 63/91* | (2006.01) |

(52) U.S. Cl.
CPC ............ *C08G 63/80* (2013.01); *C08G 63/06* (2013.01); *C08G 63/08* (2013.01); *C08G 63/823* (2013.01); *C08G 63/912* (2013.01); *C08L 67/04* (2013.01); *C08G 2261/126* (2013.01); *C08L 2205/025* (2013.01); *C08L 2205/05* (2013.01)

(58) Field of Classification Search
CPC ............ C08L 67/04; C08L 2205/025; C08L 2205/05; C08G 63/06; C08G 63/08; C08G 63/80; C08G 63/82; C08G 63/823
USPC ................. 525/410, 411, 415, 450
See application file for complete search history.

(56) References Cited

FOREIGN PATENT DOCUMENTS

| | | | |
|---|---|---|---|
| JP | 2002-356543 | 12/2002 | |
| JP | 2003-096285 | * 4/2003 | ............ C08L 67/04 |
| JP | 2003-238672 | 8/2003 | |
| JP | 2006-028336 | 2/2006 | |
| JP | 2006-307071 | 11/2006 | |
| JP | 2008-063455 | 3/2008 | |
| JP | 2009-040997 | 2/2009 | |

OTHER PUBLICATIONS

Fukushima, K., et al.; Macromolecular Symposia, 2005, p. 133-143.*

* cited by examiner

*Primary Examiner* — Robert Jones, Jr.
(74) *Attorney, Agent, or Firm* — DLA Piper LLP (US)

(57) ABSTRACT

A method of producing a polylactic acid block copolymer constituted of a segment(s) composed of L-lactic acid units and a segment(s) composed of D-lactic acid units, includes obtaining a mixture by mixing poly-L-lactic acid and poly-D-lactic acid one of which has a weight average molecular weight of 60,000 to 300,000 and the other of which has a weight average molecular weight of 10,000 to 50,000, the mixture having a weight average molecular weight of not less than 90,000 and a degree of stereocomplexation (Sc) satisfying: $Sc=\Delta Hh/(\Delta Hl+\Delta Hh) \times 100 > 60$ (wherein $\Delta Hh$ represents the heat of fusion of stereocomplex crystals (J/g), and $\Delta Hl$ represents the heat of fusion of crystals of poly-L-lactic acid alone and crystals of poly-D-lactic acid alone (J/g)); and subsequently subjecting the mixture to solid-phase polymerization at a temperature lower than the melting point of the mixture.

10 Claims, No Drawings

METHOD FOR PRODUCING POLYLACTIC ACID BLOCK COPOLYMER

RELATED APPLICATIONS

This is a §371 of International Application No. PCT/JP2011/064629, with an international filing date of Jun. 27, 2011 (WO 2012/029392 A1, published Mar. 8, 2012), which is based on Japanese Patent Application No. 2010-193119 filed Aug. 31, 2010, Japanese Patent Application No. 2011-014879 filed Jan. 27, 2011 and Japanese Patent Application No. 2011-075313 filed Mar. 30, 2011, the subject matter of which is incorporated herein by reference.

TECHNICAL FIELD

This disclosure relates to a method for producing a polylactic acid block copolymer at a high yield, which copolymer has a high molecular weight and high melting point and forms a polylactic acid stereocomplex excellent in heat resistance and crystallinity.

BACKGROUND

Polylactic acid is a macromolecule which can be practically subjected to melt molding and, because of its biodegradable property, it has been developed as biodegradable plastics that are degraded after use under a natural environment to be released as carbon dioxide gas and water. In addition, since the raw material of polylactic acid itself is a renewable resource (biomass) originated from carbon dioxide and water, release of carbon dioxide after its use neither increases nor decreases carbon dioxide in the global environment. Such a carbon-neutral nature of polylactic acid is drawing attention in recent years, and it is expected to be used as an eco-friendly material. Further, lactic acid, which is the monomer for polylactic acid, can be inexpensively produced by fermentation methods using microorganisms in recent years, and polylactic acid is therefore being studied as a material alternative to general-purpose polymers made of petroleum-based plastics. However, in comparison with petroleum-based plastics, polylactic acid has lower heat resistance and durability, and also has lower productivity due to its lower crystallization rate. Therefore, its practical use is largely restricted at present.

As a means to solve such problems, use of a polylactic acid stereocomplex is drawing attention. A polylactic acid stereocomplex is formed by mixing optically active poly-L-lactic acid (hereinafter referred to as PLLA) and poly-D-lactic acid (hereinafter referred to as PDLA), and its melting point reaches 220° C., which is 50° C. higher than the melting point of a polylactic acid homopolymer, 170° C. Therefore, attempts are being made to apply polylactic acid stereocomplexes to production of fibers, films and resin molded articles having high melting points and high crystallinities.

Conventionally, a polylactic acid stereocomplex is formed by mixing PLLA and PDLA in the solution state or by melt mixing of PLLA and PDLA under heat. However, the method by mixing of PLLA and PDLA solutions requires evaporation of the solvent after the mixing and production process is therefore laborious, resulting in high cost of the polylactic acid stereocomplex, which is problematic. Further, in the cases of melt mixing of PLLA and PDLA under heat, these need to be mixed at a temperature that allows sufficient melting of the polylactic acid stereocomplex, but such a temperature also causes thermal degradation reaction of polylactic acid, leading to decreased physical properties of the molded article, which is problematic. Further, in cases where high-molecular-weight PLLA and high-molecular-weight PDLA are melt-mixed under heat, the melting points of the polylactic acid homopolymers do not disappear even with a mixing composition ratio of 50:50, so that it is currently impossible to obtain a material having both heat resistance and durability.

On the other hand, as techniques that enable formation of a stereocomplex even with high-molecular-weight polylactic acid, polylactic acid block copolymers composed of PLLA segments and PDLA segments have been disclosed (JP 2003-238672 A, JP 2006-28336 A, 3: JP 2006-307071 A and JP 2009-40997 A).

In JP 2003-238672 A, PLLA and PDLA prepared by ring-opening polymerization or direct polycondensation were melt-mixed under heat to prepare a mixture, which was then subjected to solid-phase polymerization, to obtain a polylactic acid block copolymer.

In JP 2006-28336 A, PLLA and PDLA obtained by melt polymerization were melt-mixed under heat, and the resulting mixture was subjected to solid-phase polymerization, to prepare a polylactic acid block copolymer.

In JP 2006-307071 A, PLLA and PDLA were mixed at a temperature close to the melting point and subjected to solid-phase polymerization in the presence of crystals of the polylactic acids alone, to prepare a polylactic acid block copolymer.

In JP 2009-40997 A, PLLA and PDLA obtained by direct polycondensation were mixed at a temperature higher than the melting point, and the resulting mixture was subjected to solid-phase polymerization, to obtain a polylactic acid block copolymer.

In the technique of JP 2003-238672 A, melt mixing needs heating to a temperature higher than the melting point of the polylactic acid stereocomplex, so that decrease in the molecular weight of the mixture during melt mixing is problematic. Further, because of requirement of prolonged reaction in solid-phase polymerization, improvement of the productivity has been demanded.

In the technique of JP 2006-28336 A, high-molecular-weight polylactic acid block copolymers can be obtained only in cases where the mixing composition ratio between PLLA and PDLA was apart from 50:50. In such cases, due to low stereocomplex formation, the obtained polylactic acid block copolymer is unlikely to have improved heat resistance and crystallinity, which is problematic.

In the technique of JP 2006-307071 A, formation of a stereocomplex is controlled only by the kneading temperature, and partial melting is found during kneading. Therefore, the crystal properties of the mixture are insufficient and also variable. Further, a polylactic acid block copolymer prepared by solid-phase polymerization of this kneaded product also has insufficient crystal properties, which is problematic.

In the technique of JP 2009-40997 A, since the molecular weights of PLLA and PDLA used for kneading are not more than 50,000, prolonged reaction is required for achieving a high molecular weight by solid-phase polymerization. Further, since the yield after the solid-phase polymerization needs to be increased, improvement of the productivity has been demanded.

It could therefore be helpful to provide a method for producing a polylactic acid block copolymer that forms a polylactic acid stereocomplex having a high molecular weight and a high melting point.

SUMMARY

We thus provide:

[1] A method for producing a polylactic acid block copolymer constituted by a segment(s) composed of L-lactic acid units and a segment(s) composed of D-lactic acid units, the method comprising the steps of:

obtaining a mixture by mixing poly-L-lactic acid and poly-D-lactic acid one of which has a weight average molecular weight of 60,000 to 300,000 and the other of which has a weight average molecular weight of 10,000 to 50,000, the mixture having a weight average molecular weight of not less than 90,000 and a degree of stereocomplexation (Sc) satisfying Inequality (1):

$$Sc=\Delta Hh/(\Delta Hl+\Delta Hh)\times 100 > 60 \quad (1)$$

(wherein ΔHh represents the heat of fusion of stereocomplex crystals (J/g), and ΔHl represents the heat of fusion of crystals of poly-L-lactic acid alone and crystals of poly-D-lactic acid alone (J/g)); and subsequently subjecting the mixture to solid-phase polymerization at a temperature lower than the melting point of the mixture.

[2] A method for producing a polylactic acid block copolymer, the method comprising the steps of:

obtaining a mixture by mixing poly-L-lactic acid and poly-D-lactic acid in which the ratio between the weight average molecular weight of the polylactic acid having a higher weight average molecular weight and the weight average molecular weight of the polylactic acid having a lower weight average molecular weight is not less than 2 and less than 30, the mixture having a weight average molecular weight of not less than 90,000 and a degree of stereocomplexation (Sc) satisfying Inequality (1):

$$Sc=\Delta Hh/(\Delta Hl+\Delta Hh)\times 100 > 60 \quad (1)$$

(wherein ΔHh represents the heat of fusion of stereocomplex crystals (J/g), and ΔHl represents the heat of fusion of crystals of poly-L-lactic acid alone and crystals of poly-D-lactic acid alone (J/g)); and subsequently subjecting the mixture to solid-phase polymerization at a temperature lower than the melting point of the mixture;

are provided.

Preferably, in the method for producing a polylactic acid block copolymer, one of the poly-L-lactic acid and poly-D-lactic acid to be used as raw materials has a weight average molecular weight of not less than 170,000 and the other has a weight average molecular weight of not less than 20,000.

In the method for producing a polylactic acid block copolymer, the mixture of poly-L-lactic acid and poly-D-lactic acid preferably satisfies Inequality (2):

$$Sc=\Delta Hh/(\Delta Hl+\Delta Hh)\times 100 > 70 \quad (2)$$

In the method for producing a polylactic acid block copolymer, the obtained polylactic acid block copolymer preferably satisfies Inequality (3):

$$Sc=\Delta Hh/(\Delta Hl+\Delta Hh)\times 100 > 80 \quad (3)$$

In DSC measurement of the obtained polylactic acid block copolymer in the method for producing a polylactic acid block copolymer, the cooling crystallization temperature measured by increasing the temperature of the polylactic acid block copolymer to 250° C. and keeping the temperature constant for 3 minutes, followed by decreasing the temperature at a cooling rate of 20° C./min. is preferably not less than 130° C.

In the method for producing a polylactic acid block copolymer, the polydispersity represented by the ratio between the weight average molecular weight and the number average molecular weight of the obtained polylactic acid block copolymer is preferably not more than 2.7.

Preferably, in the method for producing a polylactic acid block copolymer, a molded product comprising the obtained polylactic acid block copolymer satisfies Inequality (4):

$$\text{Relative degree of crystallinity}=[(\Delta Hm-\Delta Hc)/\Delta Hm]\times 100 > 90 \quad (4)$$

(wherein ΔHm represents the melting enthalpy of crystals in the molded product (J/g), and ΔHc represents the crystallization enthalpy of crystals in the molded product upon temperature increase (J/g)) and has a haze value of not more than 30% when the thickness of the molded product is 100 μm.

In the method for producing a polylactic acid block copolymer, the mixture preferably comprises a catalyst in an amount of 0.001 to 0.5 part by weight with respect to 100 parts by weight of the mixture.

In the method for producing a polylactic acid block copolymer, the catalyst contained in the mixture is preferably at least one selected from the group consisting of tin compounds, titanium compounds, lead compounds, zinc compounds, cobalt compounds, iron compounds, lithium compounds, rare earth compounds and sulfonic acid compounds.

In the method for producing a polylactic acid block copolymer, the tin compounds are preferably at least one selected from the group consisting of stannous acetate, stannous octoate, tin(II) chloride and tin(IV) chloride, and the sulfonic acid compounds are preferably at least one selected from the group consisting of methanesulfonic acid, ethanesulfonic acid, propanesulfonic acid, propanedisulfonic acid, naphthalenedisulfonic acid and 2-aminoethanesulfonic acid.

In the method for producing a polylactic acid block copolymer, the temperature during the solid-phase polymerization is preferably increased stepwise or continuously.

In the method for producing a polylactic acid block copolymer, the weight average molecular weight of the obtained polylactic acid block copolymer is preferably not less than 100,000.

A polylactic acid block copolymer that forms a polylactic acid stereocomplex having a high molecular weight and a high melting point can be produced at a high yield. Since this polylactic acid block copolymer has a high molecular weight and a high melting point, it can be suitably employed in fields in which employment of polylactic acid homopolymers has been difficult because of requirement of heat resistance.

DETAILED DESCRIPTION

The polylactic acid block copolymer means a polylactic acid block copolymer in which a segment(s) composed of L-lactic acid units and a segment(s) composed of D-lactic acid units are covalently bonded to each other.

The segment composed of L-lactic acid units herein means a polymer comprising L-lactic acid as a major component and comprising not less than 70 mol % of L-lactic acid units. The segment comprises more preferably not less than 80 mol %, still more preferably not less than 90 mol %, especially preferably not less than 95 mol %, most preferably not less than 98 mol % of L-lactic acid units.

The segment composed of D-lactic acid units herein means a polymer comprising D-lactic acid as a major component and comprising not less than 70 mol % of D-lactic acid units. The segment comprises more preferably not less than 80 mol %, still more preferably not less than 90 mol %, especially preferably not less than 95 mol %, most preferably not less than 98 mol % of D-lactic acid units.

The segment composed of L-lactic acid units or D-lactic acid units may comprise other component units as long as the performance of the obtained polylactic acid block copolymer and the polylactic acid resin composition comprising the polylactic acid block copolymer is not adversely affected. Examples of the component units other than L-lactic acid and D-lactic acid units include polycarboxylic acid, polyalcohol, hydroxycarboxylic acid and lactone, and specific examples of the component units include:

polycarboxylic acids such as succinic acid, adipic acid, sebacic acid, fumaric acid, terephthalic acid, isophthalic acid, 2,6-naphthalenedicarboxylic acid, 5-sodium sulfoisophthalic acid, 5-tetrabutylphosphonium sulfoisophthalic acid, and derivatives thereof;

polyalcohols such as ethylene glycol, propylene glycol, butanediol, pentanediol, hexanediol, octanediol, neopentyl glycol, glycerin, trimethylolpropane, pentaerythritol, polyalcohol prepared by addition of ethylene oxide or propylene oxide to trimethylolpropane or pentaerythritol, aromatic polyalcohol prepared by addition reaction of bisphenol with ethylene oxide, diethylene glycol, triethylene glycol, polyethylene glycol and polypropylene glycol, and derivatives thereof;

hydroxycarboxylic acids such as glycolic acid, 3-hydroxybutyric acid, 4-hydroxybutyric acid, 4-hydroxyvaleric acid and 6-hydroxycaproic acid; and lactones such as glycolide, ε-caprolactone glycolide, ε-caprolactone, β-propiolactone, δ-butyrolactone, β- or γ-butyrolactone, pivalolactone and δ-valerolactone.

The weight average molecular weight of the polylactic acid block copolymer obtained by the method is not restricted, and is preferably not less than 100,000 and less than 300,000 in view of the mechanical properties. The weight average molecular weight is more preferably not less than 120,000 and less than 280,000, still more preferably not less than 130,000 and less than 270,000, especially preferably not less than 140,000 and less than 260,000 in view of the moldability and mechanical properties. The polydispersity of the polylactic acid block copolymer is preferably within the range of 1.5 to 3.0 in view of the mechanical properties. The polydispersity is more preferably within the range of 1.8 to 2.7, especially preferably within the range of 2.0 to 2.4 in view of the moldability and mechanical properties. The weight average molecular weight and the polydispersity are values which are measured by gel permeation chromatography (GPC) using hexafluoroisopropanol or chloroform as a solvent and calculated in terms of poly(methyl methacrylate) standards.

The polylactic acid block copolymer preferably has a degree of stereocomplexation (Sc) within the range of 80 to 100% in view of the heat resistance. The degree of stereocomplexation is more preferably within the range of 85 to 100%, especially preferably within the range of 90 to 100%. The degree of stereocomplexation herein means the ratio of stereocomplex crystals with respect to the total crystals in the polylactic acid. More particularly, it can be calculated according to Equation (3), wherein ΔHl represents the heat of fusion of crystals of poly-L-lactic acid alone and crystals of poly-D-lactic acid alone and ΔHh represents the heat of fusion of stereocomplex crystals as measured with a differential scanning calorimetry (DSC) by increasing the temperature from 30° C. to 250° C. at a heating rate of 20° C./min.

$$Sc=\Delta Hh/(\Delta Hl+\Delta Hh)\times 100 \quad (3)$$

The total number of the segment(s) composed of L-lactic acid units and segment(s) composed of D-lactic acid units contained per one molecule of the polylactic acid block copolymer is preferably not less than 3 in view of the fact that a polylactic acid block copolymer with which a polylactic acid stereocomplex having a high melting point is likely to be formed can be obtained. The total number is more preferably not less than 5, especially preferably not less than 7.

The weight ratio between the total segment(s) composed of L-lactic acid units and the total segment(s) composed of D-lactic acid units is preferably 90:10 to 10:90. The weight ratio is more preferably 80:20 to 20:80, especially preferably 75:25 to 60:40 or 40:60 to 25:75. In cases where the weight ratio of the segment(s) composed of L-lactic acid units is within the above-described preferred range, a polylactic acid stereocomplex is likely to be formed, resulting in a sufficiently large increase in the melting point of the polylactic acid block copolymer.

(Method for Preparing Polylactic Acid to be used as Raw Material)

The method for preparing poly-L-lactic acid composed of L-lactic acid units and poly-D-lactic acid composed of D-lactic acid units to be used as raw materials is not restricted, and conventional methods for production of polylactic acid may be used. More particularly, known examples of the method include the two-step lactide method wherein cyclic dimer L-lactide or D-lactide is once produced using L-lactic acid or D-lactic acid as a raw material and ring-opening polymerization is then carried out, and the one-step direct polymerization method wherein the raw material is directly subjected to dehydration condensation in a solvent or nonsolvent. Any of the production methods may be used.

The poly-L-lactic acid herein means a polymer comprising L-lactic acid as a major component and comprising not less than 70 mol % L-lactic acid units. The poly-L-lactic acid comprises preferably not less than 80 mol %, more preferably not less than 90 mol %, still more preferably not less than 95 mol %, especially preferably not less than 98 mol % L-lactic acid units.

The poly-D-lactic acid herein means a polymer comprising D-lactic acid as a major component and comprising not less than 70 mol % D-lactic acid units. The poly-D-lactic acid comprises preferably not less than 80 mol %, more preferably not less than 90 mol %, still more preferably not less than 95 mol %, especially preferably not less than 98 mol % D-lactic acid units.

Each of the amount of lactide and the amount of oligomers contained in poly-L-lactic acid or poly-D-lactic acid is preferably not more than 5%. The amount is more preferably not more than 3%, especially preferably not more than 1%. The amount of lactic acid contained in poly-L-lactic acid or poly-D-lactic acid is preferably not more than 2%. The amount is more preferably not more than 1%, especially preferably not more than 0.5%.

In terms of the acid values of the poly-L-lactic acid and poly-D-lactic acid, the acid value of one of the poly-L-lactic acid and poly-D-lactic acid is preferably 100 eq/ton. The value is more preferably not more than 50 eq/ton, still more preferably not more than 30 eq/ton, especially preferably not more than 15 eq/ton. The acid value of the other of the poly-L-lactic acid and poly-D-lactic acid to be mixed is preferably not more than 600 eq/ton. The value is more preferably not more than 300 eq/ton, still more preferably not more than 150 eq/ton, especially preferably not more than 100 eq/ton.

One of the poly-L-lactic acid and poly-D-lactic acid preferably has a weight average molecular weight of 60,000 to 300,000, and the other preferably has a weight average molecular weight of 10,000 to 50,000. In cases where the weight average molecular weight is less than 10,000, the polydispersity of the polylactic acid block copolymer is high and the weight average molecular weight cannot be high, which is problematic, while in cases where the weight average molecular weight is more than 50,000, the degree of stereocomplexation of the polylactic acid block copolymer is low, which is problematic. More preferably, the weight average molecular weight of one of the polylactic acids is 100,000 to 270,000 and the weight average molecular weight of the other is 15,000 to 45,000. Still more preferably, the weight average molecular weight of one of the polylactic acids is 150,000 to 240,000 and the weight average molecular weight of the other is 20,000 to 40,000. The combination of the weight average molecular weights of poly-L-lactic acid and poly-D-lactic acid is preferably appropriately selected such that the weight average molecular weight after mixing is not less than 90,000.

In terms of the poly-L-lactic acid and poly-D-lactic acid, the ratio of the weight average molecular weight of the polylactic acid having a higher weight average molecular weight with respect to the weight average molecular weight of the polylactic acid having a lower weight average molecular weight is preferably not less than 2 and less than 30. In cases where this ratio is less than 2, the degree of stereocomplexation of the polylactic acid block copolymer is low, which is problematic, while in cases where this ratio is not less than 30, the polydispersity of the polylactic acid block copolymer is high and the mechanical properties are poor, which is problematic. The ratio is more preferably not less than 3 and less than 20, still more preferably not less than 5 and less than 15.

Examples of the polymerization catalyst used for production of poly-L-lactic acid or poly-D-lactic acid by the ring-opening polymerization method include metal catalysts and acid catalysts. Examples of the metal catalysts include tin compounds, titanium compounds, lead compounds, zinc compounds, cobalt compounds, iron compounds, lithium compounds and rare earth compounds. Preferred examples of the types of the compounds include metal alkoxides, halogen metal compounds, organic carboxylates, carbonates, sulfates and oxides. Specific examples of the tin compounds include tin powder, tin(II) chloride, tin(IV) chloride, tin(II) bromide, tin(IV) bromide, ethoxytin(II), t-butoxytin(IV), isopropoxytin(IV), stannous acetate, tin(IV) acetate, stannous octoate, tin(II) laurate, tin(II) myristate, tin(II) palmitate, tin(II) stearate, tin(II) oleate, tin(II) linoleate, tin(II) acetylacetonate, tin(II) oxalate, tin(II) lactate, tin(II) tartrate, tin(II) pyrophosphate, tin(II) p-phenolsulfonate, tin(II) bis(methanesulfonate), tin(II) sulfate, tin(II) oxide, tin(IV) oxide, tin(II) sulfide, tin(IV) sulfide, dimethyltin(IV) oxide, methylphenyltin(IV) oxide, dibutyltin(IV) oxide, dioctyltin(IV) oxide, diphenyltin(IV) oxide, tributyltin oxide, triethyltin(IV) hydroxide, triphenyltin(IV) hydroxide, tributyltin hydride, monobutyltin(IV) oxide, tetramethyltin(IV), tetraethyltin(IV), tetrabutyltin(IV), dibutyldiphenyltin(IV), tetraphenyltin(IV), tributyltin(IV) acetate, triisobutyltin(IV) acetate, triphenyltin(IV) acetate, dibutyltin diacetate, dibutyltin dioctoate, dibutyltin(IV) dilaurate, dibutyltin(IV) maleate, dibutyltin bis(acetylacetonate), tributyltin(IV) chloride, dibutyltin dichloride, monobutyltin trichloride, dioctyltin dichloride, triphenyltin(IV) chloride, tributyltin sulfide, tributyltin sulfate, tin(II) methanesulfonate, tin(II) ethanesulfonate, tin(II) trifluoromethanesulfonate, ammonium hexachlorostannate(IV), dibutyltin sulfide, diphenyltin sulfide, triethyltin sulfate and tin(II) phthalocyanine. Specific examples of the titanium compounds include titanium methoxide, titanium propoxide, titanium isopropoxide, titanium butoxide, titanium isobutoxide, titanium cyclohexide, titanium phenoxide, titanium chloride, titanium diacetate, titanium triacetate, titanium tetraacetate and titanium(IV) oxide. Specific examples of the lead compounds include diisopropoxylead(II), lead monochloride, lead acetate, lead(II) octoate, lead(II) isooctoate, lead(II) isononanoate, lead(II) laurate, lead(II) oleate, lead(II) linoleate, lead naphthenate, lead(II) neodecanoate, lead oxide and lead(II) sulfate. Specific examples of the zinc compounds include zinc powder, methylpropoxy zinc, zinc chloride, zinc acetate, zinc(II) octoate, zinc naphthenate, zinc carbonate, zinc oxide and zinc sulfate. Specific examples of the cobalt compounds include cobalt chloride, cobalt acetate, cobalt(II) octoate, cobalt(II) isooctoate, cobalt(II) isononanoate, cobalt(II) laurate, cobalt(II) oleate, cobalt(II) linoleate, cobalt naphthenate, cobalt(II) neodecanoate, cobalt(II) carbonate, cobalt(II) sulfate and cobalt(II) oxide. Specific examples of the iron compounds include iron(II) chloride, iron(II) acetate, iron(II) octoate, iron naphthenate, iron(II) carbonate, iron(II) sulfate and iron(II) oxide. Specific examples of the lithium compounds include lithium propoxide, lithium chloride, lithium acetate, lithium octoate, lithium naphthenate, lithium carbonate, dilithium sulfate and lithium oxide. Specific examples of the rare earth compounds include triisopropoxyeuropium(III), triisopropoxyneodymium(III), triisopropoxylanthanum, triisopropoxysamarium(III), triisopropoxyyttrium, isopropoxyyttrium, dysprosium chloride, europium chloride, lanthanum chloride, neodymium chloride, samarium chloride, yttrium chloride, dysprosium(III) triacetate, europium(III) triacetate, lanthanum acetate, neodymium triacetate, samarium acetate, yttrium triacetate, dysprosium(III) carbonate, dysprosium(IV) carbonate, europium(II) carbonate, lanthanum carbonate, neodymium carbonate, samarium(II) carbonate, samarium(III) carbonate, yttrium carbonate, dysprosium sulfate, europium(II) sulfate, lanthanum sulfate, neodymium sulfate, samarium sulfate, yttrium sulfate, europium dioxide, lanthanum oxide, neodymium oxide, samarium(III) oxide and yttrium oxide. Other examples of the metal catalysts include potassium compounds such as potassium isopropoxide, potassium chloride, potassium acetate, potassium octoate, potassium naphthenate, potassium t-butyl carbonate, potassium sulfate and potassium oxide; copper compounds such as copper(II) diisopropoxide, copper(II) chloride, copper(II) acetate, copper octoate, copper naphthenate, copper(II) sulfate and dicopper carbonate; nickel compounds such as nickel chloride, nickel acetate, nickel octoate, nickel carbonate, nickel(II) sulfate and nickel oxide; zirconium compounds such as tetraisopropoxyzirconium(IV), zirconium trichloride, zirconium acetate, zirconium octoate, zirconium naphthenate, zirconium(II) carbonate, zirconium(IV) carbonate, zirconium sulfate and zirconium(II) oxide; antimony compounds such as triisopropoxyantimony, antimony(III) fluoride, antimony(V) fluoride, antimony acetate and antimony(III) oxide; magnesium compounds such as magnesium, magnesium diisopropoxide, magnesium chloride, magnesium acetate, magnesium lactate, magnesium carbonate, magnesium sulfate and magnesium oxide; calcium compounds such as diisopropoxycalcium, calcium chloride, calcium acetate, calcium octoate, calcium naphthenate, calcium lactate and calcium sulfate; aluminum compounds such as aluminum, aluminum isopropoxide, aluminum chloride, aluminum acetate, aluminum octoate, aluminum sulfate and aluminum oxide; germanium compounds such as germanium, tetraisopropoxygermane and germanium(IV) oxide; manganese compounds such as triisopropoxymanganese(III), manganese trichloride, manganese acetate, manganese(II) octoate, manganese(II) naphthenate and manganese(II) sulfate; and bismuth compounds such as bismuth(III) chloride, bismuth powder, bismuth(III) oxide, bismuth acetate, bismuth octoate and bismuth neodecanoate. Still other preferred examples of the metal catalysts include compounds composed of two or more kinds of metallic elements, such as sodium stannate, magnesium stannate, potassium stannate, calcium stannate, manganese stannate, bismuth stannate, barium stannate, strontium stannate, sodium titanate, magnesium titanate, aluminum titanate, potassium titanate, calcium titanate, cobalt titanate, zinc titanate, manganese titanate, zirconium titanate, bismuth titanate, barium titanate and strontium titanate. The acid catalyst may be either a Brønsted acid as a proton donor or a Lewis acid as an electron-pair acceptor, and may be either an organic acid or an inorganic acid. Specific examples of the acid catalyst include monocarboxylic acid compounds such as formic acid, acetic acid, propionic acid, heptanoic acid, octanoic acid, octylic acid, nonanoic acid, isononanoic acid, trifluoroacetic acid and trichloroacetic acid; dicarboxylic acid compounds such as oxalic acid, succinic acid, maleic acid, tartaric acid and malonic acid; tricarboxylic acid compounds such as citric acid and tricarballylic acid; sulfonic acid compounds such as aromatic sulfonic acids including benzenesulfonic acid, n-butylbenzenesulfonic acid, n-octylbenzenesulfonic acid, n-dodecylbenzenesulfonic acid, pentadecylbenzenesulfonic acid, 2,5-dimethylbenzenesulfonic acid, 2,5-dibutylbenzenesulfonic acid, o-aminobenzenesulfonic acid, m-aminobenzenesulfonic acid, p-aminobenzenesulfonic acid, 3-amino 4-hydroxybenzenesulfonic acid, 5-amino-2-methylbenzenesulfonic acid, 3,5-diamino-2,4,6-trimethylbenzenesulfonic acid, 2,4-dinitrobenzenesulfonic acid, p-chlorobenzenesulfonic acid, 2,5-dichlorobenzenesulfonic acid, p-phenolsulfonic acid, cumene sulfonic acid, xylenesulfonic acid, o-cresolsulfonic acid, m-cresolsulfonic acid, p-cresolsulfonic acid, p-toluenesulfonic acid, 2-naphthalenesulfonic acid, 1-naphthalenesulfonic acid, isopropylnaphthalenesulfonic acid, dodecylnaphthalenesulfonic acid, dinonylnaphthalenesulfonic acid, dinonylnaphthalenedisulfonic acid, 1,5-naphthalenedisulfonic acid, 2,7-naphthalenedisulfonic acid, 4,4-biphenyldisulfonic acid, anthraquinone-2-sulfonic acid, m-benzenedisulfonic acid, 2,5-diamino-1,3-benzenedisulfonic acid, aniline-2,4-disulfonic acid, anthraquinone-1,5-disulfonic acid and polystyrene sulfonic acid, aliphatic sulfonic acids including methanesulfonic acid, ethanesulfonic acid, 1-propanesulfonic acid, n-octylsulfonic acid, pentadecylsulfonic acid, trifluoromethanesulfonic acid, trichloromethanesulfonic acid, 1,2-ethanedisulfonic acid, 1,3-propanedisulfonic acid, aminomethanesulfonic acid and 2-aminoethanesulfonic acid, alicyclic sulfonic acids including cyclopentanesulfonic acid, cyclohexanesulfonic acid, camphorsulfonic acid and 3-cyclohexylaminopropanesulfonic acid; acidic amino acids such as aspartic acid and glutamic acid; ascorbic acid; retinoic acid; phosphoric acid compounds such as phosphoric acid, metaphosphoric acid, phosphorus acid, hypophosphorous acid, polyphosphoric acid, phosphoric acid monoesters including monododecyl phosphate and monooctadecyl phosphate, phosphoric acid diesters including didodecyl phosphate and dioctadecyl phosphate, phosphorus acid monoesters and phosphorus acid diesters; boric acid; hydrochloric acid; and sulfuric acid. The form of the acid catalyst is not restricted, and may be either a solid acid catalyst or a liquid acid catalyst. Examples of the solid acid catalyst include natural minerals such as acid clay, kaolinite, bentonite, montmorillonite, talc, zirconium silicate and zeolite; oxides such as silica, alumina, titania and zirconia; oxide complexes such as silica alumina, silica magnesia, silica boria, alumina boria, silica titania and silica zirconia; chlorinated alumina; fluorinated alumina; and positive ion exchange resins.

In view of the molecular weight of the produced polylactic acid, the polymerization catalyst is preferably a metal catalyst, and, among metal catalysts, tin compounds, titanium compounds, antimony compounds and rare earth compounds are more preferred. In view of the melting point of the produced polylactic acid, tin compounds and titanium compounds are more preferred. Further, in view of the thermal stability of the produced polylactic acid, tin-based organic carboxylates and tin-based halogen compounds are preferred, and stannous acetate, stannous octoate and tin(II) chloride are more preferred.

The amount of the polymerization catalyst to be added is not restricted, and preferably not less than 0.001 part by weight and not more than 2 parts by weight, especially preferably not less than 0.001 part by weight and not more than 1 part by weight with respect to 100 parts by weight of the raw materials used (L-lactic acid, D-lactic acid and/or the like). In cases where the amount of catalyst is within the above-described preferred range, the effect of reducing the polymerization time can be obtained, and the molecular weight of the polylactic acid block copolymer finally obtained tends to be high. Further, in cases where two or more types of catalysts are used in combination, the total amount of the catalysts added is preferably within the above-described range.

The timing of addition of the polymerization catalyst is not restricted, and the catalyst is preferably added after melting of the lactide under heat in view of uniform dispersion of the catalyst in the system and enhancement of the polymerization activity.

Preferred examples of the polymerization catalyst to be used for production of the poly-L-lactic acid or poly-D-lactic acid using the direct polymerization method include metal catalysts and acid catalysts. Preferred examples of the metal catalysts include tin compounds, titanium compounds, lead compounds, zinc compounds, cobalt compounds, iron compounds, lithium compounds and rare earth compounds. Preferred examples of the types of the compounds include metal alkoxides, halogen metal compounds, organic carboxylates, carbonates, sulfates and oxides. Specific examples of the tin compounds include tin powder, tin(II) chloride, tin(IV) chloride, tin(II) bromide, tin(IV) bromide, ethoxytin(II), t-butoxytin(IV), isopropoxytin(IV), stannous acetate, tin(IV) acetate, stannous octoate, tin(II) laurate, tin(II) myristate, tin(II) palmitate, tin(II) stearate, tin(II) oleate, tin(II) linoleate, tin(II) acetylacetonate, tin(II) oxalate, tin(II) lactate, tin(II) tartrate, tin(II) pyrophosphate, tin(II) p-phenolsulfonate, tin(II) bis(methanesulfonate), tin(II) sulfate, tin(II) oxide, tin(IV) oxide, tin(II) sulfide, tin(IV) sulfide, dimethyltin(IV) oxide, methylphenyltin(IV) oxide, dibutyltin(IV) oxide, dioctyltin(IV) oxide, diphenyltin(IV) oxide, tributyltin oxide, triethyltin(IV) hydroxide, triphenyltin(IV) hydroxide, tributyltin hydride, monobutyltin(IV) oxide, tetramethyltin (IV), tetraethyltin(IV), tetrabutyltin(IV), dibutyldiphenyltin (IV), tetraphenyltin(IV), tributyltin(IV) acetate, triisobutyltin (IV) acetate, triphenyltin(IV) acetate, dibutyltin diacetate, dibutyltin dioctoate, dibutyltin(IV) dilaurate, dibutyltin(IV) maleate, dibutyltin bis(acetylacetonate), tributyltin(IV) chloride, dibutyltin dichloride, monobutyltin trichloride, dioctyltin dichloride, triphenyltin(IV) chloride, tributyltin sulfide, tributyltin sulfate, tin(II) methanesulfonate, tin(II) ethanesulfonate, tin(II) trifluoromethanesulfonate, ammonium hexachlorostannate(IV), dibutyltin sulfide, diphenyltin sulfide, triethyltin sulfate and tin(II) phthalocyanine. Specific examples of the titanium compounds include titanium methoxide, titanium propoxide, titanium isopropoxide, titanium butoxide, titanium isobutoxide, titanium cyclohexide, titanium phenoxide, titanium chloride, titanium diacetate, titanium triacetate, titanium tetraacetate and titanium(IV) oxide. Specific examples of the lead compounds include diisopropoxylead(II), lead monochloride, lead acetate, lead(II) octoate, lead(II) isooctoate, lead(II) isononanoate, lead(II) laurate, lead(II) oleate, lead(II) linoleate, lead naphthenate, lead(II) neodecanoate, lead oxide and lead(II) sulfate. Specific examples of the zinc compounds include zinc powder, methylpropoxy zinc, zinc chloride, zinc acetate, zinc(II) octoate, zinc naphthenate, zinc carbonate, zinc oxide and zinc sulfate. Specific examples of the cobalt compounds include cobalt chloride, cobalt acetate, cobalt(II) octoate, cobalt(II) isooctoate, cobalt(II) isononanoate, cobalt(II) laurate, cobalt (II) oleate, cobalt(II) linoleate, cobalt naphthenate, cobalt(II) neodecanoate, cobalt(II) carbonate, cobalt(II) sulfate and cobalt(II) oxide. Specific examples of the iron compounds include iron(II) chloride, iron(II) acetate, iron(II) octoate, iron naphthenate, iron(II) carbonate, iron(II) sulfate and iron (II) oxide. Specific examples of the lithium compounds include lithium propoxide, lithium chloride, lithium acetate, lithium octoate, lithium naphthenate, lithium carbonate, dilithium sulfate and lithium oxide. Specific examples of the rare earth compounds include triisopropoxyeuropium(III), triisopropoxyneodymium(III), triisopropoxylanthanum, triisopropoxysamarium(III), triisopropoxyyttrium, isopropoxyyttrium, dysprosium chloride, europium chloride, lanthanum chloride, neodymium chloride, samarium chloride, yttrium chloride, dysprosium(III) triacetate, europium(III) triacetate, lanthanum acetate, neodymium triacetate, samarium acetate, yttrium triacetate, dysprosium(III) carbonate, dysprosium(IV) carbonate, europium(II) carbonate, lanthanum carbonate, neodymium carbonate, samarium(II) carbonate, samarium(III) carbonate, yttrium carbonate, dysprosium sulfate, europium(II) sulfate, lanthanum sulfate, neodymium sulfate, samarium sulfate, yttrium sulfate, europium dioxide, lanthanum oxide, neodymium oxide, samarium(III) oxide and yttrium oxide. Other examples of the metal catalysts include potassium compounds such as potassium isopropoxide, potassium chloride, potassium acetate, potassium octoate, potassium naphthenate, potassium t-butyl carbonate, potassium sulfate and potassium oxide; copper compounds such as copper(II) diisopropoxide, copper(II) chloride, copper(II) acetate, copper octoate, copper naphthenate, copper(II) sulfate and dicopper carbonate; nickel compounds such as nickel chloride, nickel acetate, nickel octoate, nickel carbonate, nickel(II) sulfate and nickel oxide; zirconium compounds such as tetraisopropoxyzirconium(IV), zirconium trichloride, zirconium acetate, zirconium octoate, zirconium naphthenate, zirconium(II) carbonate, zirconium(IV) carbonate, zirconium sulfate and zirconium(II) oxide; antimony compounds such as triisopropoxyantimony, antimony (III) fluoride, antimony(V) fluoride, antimony acetate and antimony(III) oxide; magnesium compounds such as magnesium, magnesium diisopropoxide, magnesium chloride, magnesium acetate, magnesium lactate, magnesium carbonate, magnesium sulfate and magnesium oxide; calcium compounds such as diisopropoxycalcium, calcium chloride, calcium acetate, calcium octoate, calcium naphthenate, calcium lactate and calcium sulfate; aluminum compounds such as aluminum, aluminum isopropoxide, aluminum chloride, aluminum acetate, aluminum octoate, aluminum sulfate and aluminum oxide; germanium compounds such as germanium, tetraisopropoxygermane and germanium(IV) oxide; manganese compounds such as triisopropoxymanganese(III), manganese trichloride, manganese acetate, manganese(II) octoate, manganese(II) naphthenate and manganese(II) sulfate; and bismuth compounds such as bismuth(III) chloride, bismuth powder, bismuth(III) oxide, bismuth acetate, bismuth octoate and bismuth neodecanoate. Still other preferred examples of the metal catalysts include compounds composed of two or more kinds of metallic elements, such as sodium stannate, magnesium stannate, potassium stannate, calcium stannate, manganese stannate, bismuth stannate, barium stannate, strontium stannate, sodium titanate, magnesium titanate, aluminum titanate, potassium titanate, calcium titanate, cobalt titanate, zinc titanate, manganese titanate, zirconium titanate, bismuth titanate, barium titanate and strontium titanate. The preferred acid catalyst may be either a Brønsted acid as a proton donor or a Lewis acid as an electron-pair acceptor, and may be either an organic acid or an inorganic acid. Specific examples of the acid catalyst include monocarboxylic acid compounds such as formic acid, acetic acid, propionic acid, heptanoic acid, octanoic acid, octylic acid, nonanoic acid, isononanoic acid, trifluoroacetic acid and trichloroacetic acid; dicarboxylic acid compounds such as oxalic acid, succinic acid, maleic acid, tartaric acid and malonic acid; tricarboxylic acid compounds such as citric acid and tricarballylic acid; sulfonic acid compounds such as aromatic sulfonic acids including benzenesulfonic acid, n-butylbenzenesulfonic acid, n-octylbenzenesulfonic acid, n-dodecylbenzenesulfonic acid, pentadecylbenzenesulfonic acid, 2,5-dimethylbenzenesulfonic acid, 2,5-dibutylbenzenesulfonic acid, o-aminobenzenesulfonic acid, m-aminobenzenesulfonic acid, p-aminobenzenesulfonic acid, 3-amino 4-hydroxybenzenesulfonic acid, 5-amino-2-methylbenzenesulfonic acid, 3,5-diamino-2,4,6-trimethylbenzenesulfonic acid, 2,4-dinitrobenzenesulfonic acid, p-chlorobenzenesulfonic acid, 2,5-dichlorobenzenesulfonic acid, p-phenolsulfonic acid, cumene sulfonic acid, xylenesulfonic acid, o-cresolsulfonic acid, m-cresolsulfonic acid, p-cresolsulfonic acid, p-toluenesulfonic acid, 2-naphthalenesulfonic acid, 1-naphthalenesulfonic acid, isopropylnaphthalenesulfonic acid, dodecylnaphthalenesulfonic acid, dinonylnaphthalenesulfonic acid, dinonylnaphthalenedisulfonic acid, 1,5-naphthalenedisulfonic acid, 2,7-naphthalenedisulfonic acid, 4,4-biphenyldisulfonic acid, anthraquinone-2-sulfonic acid, m-benzenedisulfonic acid, 2,5-diamino-1,3-benzenedisulfonic acid, aniline-2,4-disulfonic acid, anthraquinone-1,5-disulfonic acid and polystyrene sulfonic acid, aliphatic sulfonic acids including methanesulfonic acid, ethanesulfonic acid, 1-propanesulfonic acid, n-octylsulfonic acid, pentadecylsulfonic acid, trifluoromethanesulfonic acid, trichloromethanesulfonic acid, 1,2-ethanedisulfonic acid, 1,3-propanedisulfonic acid, aminomethanesulfonic acid and 2-aminoethanesulfonic acid, alicyclic sulfonic acids including cyclopentanesulfonic acid, cyclohexanesulfonic acid, camphorsulfonic acid and 3-cyclohexylaminopropanesulfonic acid; acidic amino acids such as aspartic acid and glutamic acid; ascorbic acid; retinoic acid; phosphoric acid compounds such as phosphoric acid, metaphosphoric acid, phosphorus acid, hypophosphorous acid, polyphosphoric acid, phosphoric acid monoesters including monododecyl phosphate and monooctadecyl phosphate, phosphoric acid diesters including didodecyl phosphate and dioctadecyl phosphate, phosphorus acid monoesters and phosphorus acid diesters; boric acid; hydrochloric acid; and sulfuric acid. The form of the acid catalyst is not restricted, and may be either a solid acid catalyst or a liquid acid catalyst. Examples of the solid acid catalyst include natural minerals such as acid clay, kaolinite, bentonite, montmorillonite, talc, zirconium silicate and zeolite; oxides such as silica, alumina, titania and zirconia; oxide complexes such as silica alumina, silica magnesia, silica boria, alumina boria, silica titania and silica zirconia; chlorinated alumina; fluorinated alumina; and positive ion exchange resins.

In view of the molecular weight of the produced polylactic acid, tin compounds, titanium compounds, antimony compounds, rare earth compounds and acid catalysts are preferred. In view of the melting point of the produced polylactic acid, tin compounds, titanium compounds and sulfonic acid compounds are more preferred. Further, in view of the thermal stability of the produced polylactic acid, in the case of a metal catalyst, tin-based organic carboxylates and tin-based halogen compounds are preferred, and stannous acetate, stannous octoate and tin(II) chloride are more preferred; and, in the case of an acid catalyst, mono- and disulfonic acid compounds are preferred, and methanesulfonic acid, ethanesulfonic acid, propanesulfonic acid, propanedisulfonic acid, naphthalenedisulfonic acid and 2-aminoethanesulfonic acid are more preferred. The catalyst may be of a single type, or two or more types of catalysts may be used in combination. In view of enhancement of the polymerization activity, two or more types of catalysts are preferably used in combination. In view of also allowing suppression of coloring, one or more selected from tin compounds and/or one or more selected from sulfonic acid compounds is/are preferably used. In view of achievement of excellent productivity, it is preferred to employ stannous acetate and/or stannous octoate in combination with any one or more of methanesulfonic acid, ethanesulfonic acid, propanedisulfonic acid, naphthalenedisulfonic acid and 2-aminoethanesulfonic acid, and it is more preferred to employ stannous acetate and/or stannous octoate in combination with any one of methanesulfonic acid, ethanesulfonic acid, propanedisulfonic acid and 2-aminoethanesulfonic acid.

The amount of polymerization catalyst to be added is not restricted, and preferably not less than 0.001 part by weight and not more than 0.5 part by weight, especially preferably not less than 0.001 part by weight and not more than 0.3 part by weight with respect to 100 parts by weight of the raw materials used (L-lactic acid, D-lactic acid and/or the like). In cases where the amount of catalyst is within the above-described preferred range, the effect of reducing the polymerization time can be obtained, and the molecular weight of the polylactic acid block copolymer finally obtained tends to be high. Further, in cases where two or more types of catalysts are used in combination, the total amount of the catalysts added is preferably within the above-described range. In cases where one or more types selected from tin compounds and/or one or more types selected from sulfonic acid compounds are used in combination, the weight ratio between the tin compound(s) and the sulfonic acid compound(s) is preferably 1:1 to 1:30 in view of allowing maintenance of high polymerization activity and suppression of coloring. In view of achievement of excellent productivity, the weight ratio between the tin compound(s) and the sulfonic acid compound(s) is more preferably 1:2 to 1:15.

The timing of addition of the polymerization catalyst is not restricted, and the acid catalyst is preferably added to the raw materials or dehydrated raw materials in view of achievement of excellent productivity, and the metal catalyst is preferably added after dehydration of the raw materials in view of enhancement of the polymerization activity.

(Method for Mixing Polylactic Acid)

The step of mixing poly-L-lactic acid and poly-D-lactic acid will now be described.

It is important to mix poly-L-lactic acid and poly-D-lactic acid such that the resulting mixture has a degree of stereocomplexation (Sc) of more than 60% and up to 100% immediately before the solid-phase polymerization, and to subject the mixture to the solid-phase polymerization. The degree of stereocomplexation (Sc) of the mixture is preferably more than 70% and not more than 99%, especially preferably more than 80% and not more than 95%. The degree of stereocomplexation herein means the ratio of stereocomplex crystals contained with respect to the total crystals in the polylactic acid. More particularly, it can be calculated according to the Equation (4) below, wherein $\Delta Hl$ represents the heat of fusion of crystals of poly-L-lactic acid alone and crystals of poly-D-lactic acid alone and $\Delta Hh$ represents the heat of fusion of stereocomplex crystals as measured with a differential scanning calorimetry (DSC) by increasing the temperature from 30° C. to 250° C. at a heating rate of 20° C./min.

$$Sc = \Delta Hh/(\Delta Hl + \Delta Hh) \times 100 \qquad (4)$$

Whether or not the poly-L-lactic acid and poly-D-lactic acid to be used for the mixing are crystallized is not restricted, and either poly-L-lactic acid and poly-D-lactic acid in the crystallized state may be mixed, or poly-L-lactic acid and poly-D-lactic acid in the molten state may be mixed. In cases where crystallization of the poly-L-lactic acid and poly-D-lactic acid to be used for the mixing is carried out, specific examples of the method thereof include a method by maintaining the polylactic acids at a crystallization treatment temperature in the gas phase or liquid phase and a method by cooling and solidifying a molten mixture of poly-L-lactic acid and poly-D-lactic acid while carrying out the operation of stretching or shearing. In view of the simplicity of operation, the method by maintaining the polylactic acids at a crystallization treatment temperature in the gas phase or liquid phase is preferred.

The crystallization treatment temperature herein is not restricted as long as the temperature is higher than the glass-transition temperature and lower than the melting point of the polylactic acid having a lower melting point selected from the poly-L-lactic acid and the poly-D-lactic acid mixed as described above. The crystallization treatment temperature is more preferably between the heating crystallization temperature and the cooling crystallization temperature as measured with a differential scanning calorimetry (DSC) in advance.

Crystallization may be carried out under any of the conditions of reduced, normal and increased pressures.

The crystallization period is not restricted, and crystallization can be sufficiently achieved within 3 hours, and a period of not more than 2 hours is also preferred.

The method for mixing the poly-L-lactic acid and poly-D-lactic acid is not restricted, and examples of the method include a method wherein melt mixing is performed at a temperature of not less than the end of melting point of the component having a higher melting point selected from the poly-L-lactic acid and poly-D-lactic acid, and a method wherein the poly-L-lactic acid and poly-D-lactic acid are mixed in a solvent and the solvent is then removed. In view of efficient mixing, the method wherein melt mixing is performed at a temperature of not less than the end of melting point is preferred.

The melting point herein means the temperature at the peak top of the peak due to melting of crystals of polylactic acid alone as measured with a differential scanning calorimetry (DSC), and the end of melting point means the temperature at the end of the peak due to melting of crystals of polylactic acid alone as measured with a differential scanning calorimetry (DSC).

Examples of the method wherein melt mixing is performed at a temperature of not less than the end of melting point include a method wherein poly-L-lactic acid and poly-D-lactic acid are mixed by a batch method or continuous method, either of which may be employed for the mixing. Examples of the extruder include single screw extruders, twin screw extruders, plastomill, kneaders and stirring-vessel-type reactors equipped with a pressure reducing device. In view of enabling uniform and sufficient kneading, a single screw extruder or twin screw extruder is preferably used.

In the kneading using an extruder, the method for supplying polylactic acid is not restricted, and examples of possible methods thereof include a method wherein poly-L-lactic acid and poly-D-lactic acid are supplied at once from a resin hopper, and a method wherein, using a side resin hopper as required, poly-L-lactic acid and poly-D-lactic acid are separately supplied via a resin hopper and a side resin hopper. The polylactic acid may also be supplied in the molten state to the extruder directly after the step of producing the polylactic acid.

The screw element of the extruder is preferably equipped with a kneading element in the mixing section such that the poly-L-lactic acid and poly-D-lactic acid can be uniformly mixed to form stereocomplexes.

In terms of the temperature conditions for the mixing, the mixing is preferably carried out at a temperature of not less than the end of melting point of the component having a higher melting point selected from the poly-L-lactic acid and poly-D-lactic acid. The temperature is within the range of preferably 140° C. to 250° C., more preferably 160° C. to 230° C., especially preferably 180° C. to 210° C. In cases where the mixing temperature is within the above-described preferred range, the mixing can be carried out in the molten state, and the molecular weight of the mixture is less likely to decrease during the mixing. Further, the fluidity of the mixture can be kept constant and remarkable decrease in the fluidity is less likely to occur.

In terms of the time conditions for the mixing, the mixing time is within the range of preferably 0.1 to 10 minutes, more preferably 0.3 to 5 minutes, especially preferably 0.5 to 3 minutes. In cases where the mixing time is within the above-described preferred range, the poly-L-lactic acid and poly-D-lactic acid can be uniformly mixed, and thermal degradation is less likely to occur during the mixing.

The pressure conditions during the mixing are not restricted, and the mixing may be carried out either in the air or under an atmosphere of an inert gas such as nitrogen.

In the mixing step, the mixing weight ratio between the poly-L-lactic acid composed of L-lactic acid units and the poly-D-lactic acid composed of D-lactic acid units is preferably 90:10 to 10:90. The mixing weight ratio is more preferably 80:20 to 20:80, especially preferably 75:25 to 60:40 or 40:60 to 25:75. In cases where the weight ratio of the poly-L-lactic acid composed of L-lactic acid units is within the above-described preferred range, the amount of increase in the melting point of the polylactic acid block copolymer finally obtained is large, and a polylactic acid stereocomplex is likely to be formed. In cases where the mixing weight ratio between the poly-L-lactic acid and poly-D-lactic acid is other than 50:50, it is preferred to blend the poly-L-lactic acid or poly-D-lactic having a higher weight average molecular weight than the other in a larger amount.

In this mixing step, it is preferred to include a catalyst in the mixture for efficiently promoting the subsequent solid-phase polymerization. The catalyst may be the residual component(s) of the catalyst(s) used for producing the poly-L-lactic acid and/or poly-D-lactic acid, and/or one or more selected from the above-described catalysts may be further added in the mixing step.

The content of the catalyst is not restricted, and preferably not less than 0.001 part by weight and not more than 0.5 part by weight, especially preferably not less than 0.001 part by weight and not more than 0.3 part by weight with respect to 100 parts by weight of the mixture of the poly-L-lactic acid and poly-D-lactic acid. In cases where the amount of catalyst is within the above-described preferred range, the effect of reducing the polymerization time can be obtained, and the molecular weight of the polylactic acid block copolymer finally obtained tends to be high.

Further, in the mixing step, a polyfunctional compound(s) may be mixed within the range in which the effects are not adversely affected, in order to increase the alternating property of the poly-L-lactic acid composed of L-lactic acid units (segments composed of L-lactic acid units) and the poly-D-lactic acid composed of D-lactic acid units (segments composed of D-lactic acid units) in the polylactic acid block copolymer finally obtained.

The polyfunctional compound(s) to be used herein is/are not restricted, and examples thereof include polycarboxylic anhydrides, polycarboxylic acid halides, polycarboxylic acids, polyisocyanates, polyamines, polyalcohols and polyepoxy compounds. Specific examples of the polyfunctional compound(s) include polycarboxylic anhydrides such as 1,2-cyclohexanedicarboxylic anhydride, succinic anhydride, phthalic anhydride, trimellitic anhydride, 1,8-naphthalenedicarboxylic anhydride and pyromellitic anhydride; polycarboxylic acid halides such as isophthalic acid chloride, terephthalic acid chloride and 2,6-naphthalenedicarboxylic acid chloride; polycarboxylic acids such as succinic acid, adipic acid, sebacic acid, fumaric acid, terephthalic acid, isophthalic acid and 2,6-naphthalenedicarboxylic acid; polyisocyanates such as hexamethylene diisocyanate, 4,4'-diphenylmethane diisocyanate and toluene-2,4-diisocyanate; polyamines such as ethylenediamine, hexanediamine and diethylene triamine; polyalcohols such as ethylene glycol, propylene glycol, butanediol, hexanediol, glycerin, trimethylolpropane and pentaerythritol; and polyepoxy compounds such as diglycidyl terephthalate, naphthalenedicarboxylic acid diglycidyl ester, trimellitic acid triglycidyl ester, pyromellitic acid tetraglycidyl ester, ethylene glycol diglycidyl ether, propylene glycol diglycidyl ether, cyclohexane dimethanol diglycidyl ether, glycerol triglycidyl ether, trimethylolpropane triglycidyl ether and pentaerythritol polyglycidyl ether. The polyfunctional compound(s) is/are preferably a polycarboxylic anhydride(s), polyisocyanate(s), polyalcohol(s) and/or polyepoxy compound(s), and is/are especially preferably a polycarboxylic anhydride(s), polyisocyanate(s) and/or polyepoxy compound(s). One of these or a combination of two or more of these may be used.

The amount of the polyfunctional compound(s) to be mixed is not restricted, and is preferably not less than 0.01 part by weight and not more than 20 parts by weight, more preferably not less than 0.1 part by weight and not more than 10 parts by weight with respect to 100 parts by weight of the total of poly-L-lactic acid and poly-D-lactic acid. In cases where the amount of the polyfunctional compound(s) added is within the above-described preferred range, the effect of use of the polyfunctional compound(s) can be produced.

Further, when a polyfunctional compound(s) is/are used, a reaction catalyst(s) may be added for promoting reaction of the poly-L-lactic acid and poly-D-lactic acid with the polyfunctional compound(s). Examples of the reaction catalyst(s) include alkali metal compounds such as sodium hydroxide, potassium hydroxide, lithium hydroxide, cesium hydroxide, sodium hydrogen carbonate, potassium hydrogen carbonate, sodium carbonate, potassium carbonate, lithium carbonate, sodium acetate, potassium acetate, lithium acetate, sodium stearate, potassium stearate, lithium stearate, sodium borohydride, lithium borohydride, sodium phenylborate, sodium benzoate, potassium benzoate, lithium benzoate, disodium hydrogenphosphate, dipotassium hydrogenphosphate, dilithium hydrogenphosphate, disodium salt of bisphenol A, dipotassium salt of bisphenol A, dilithium salt of bisphenol A, sodium salt of phenol, potassium salt of phenol, lithium salt of phenol and cesium salt of phenol; alkaline earth metal compounds such as calcium hydroxide, barium hydroxide, magnesium hydroxide, strontium hydroxide, calcium hydrogen carbonate, barium carbonate, magnesium carbonate, strontium carbonate, calcium acetate, barium acetate, magnesium acetate, strontium acetate, calcium stearate, magnesium stearate and strontium stearate; tertiary amines such as triethylamine, tributylamine, trihexylamine, triamylamine, triethanolamine, dimethyl aminoethanol, triethylenediamine, dimethylphenylamine, dimethylbenzylamine, 2-(dimethylaminomethyl)phenol, dimethylaniline, pyridine, picoline and 1,8-diazabicyclo(5,4,0)undecene-7; imidazole compounds such as 2-methylimidazole, 2-ethylimidazole, 2-isopropylimidazole, 2-ethyl-4-methylimidazole and 4-phenyl-2-methylimidazole; quaternary ammonium salts such as tetramethylammonium chloride, tetraethylammonium chloride, tetrabutylammonium bromide, trimethylbenzylammonium chloride, triethylbenzylammonium chloride, tripropylbenzylammonium chloride and N-methylpyridinium chloride; phosphine compounds such as trimethylphosphine, triethylphosphine, tributylphosphine and trioctylphosphine; phosphonium salts such as tetramethylphosphonium bromide, tetrabutylphosphonium bromide, tetraphenylphosphonium bromide, ethyltriphenylphosphonium bromide and triphenylbenzylphosphonium bromide; phosphoric acid esters such as trimethyl phosphate, triethyl phosphate, tributyl phosphate, trioctyl phosphate, tributoxyethyl phosphate, triphenyl phosphate, tricresyl phosphate, trixylenyl phosphate, cresyl diphenyl phosphate, octyl diphenyl phosphate, trip-hydroxy)phenyl phosphate and tri(p-methoxy)phenyl phosphate; organic acids such as oxalic acid, p-toluenesulfonic acid, dinonylnaphthalene disulfonic acid and dodecylbenzenesulfonic acid; and Lewis acids such as boron trifluoride, aluminum tetrachloride, titanium tetrachloride and tin tetrachloride. One of these or a combination of two or more of these may be used.

The amount of the reaction catalyst(s) to be added is not restricted, and is preferably not less than 0.001 part by weight and not more than 0.5 part by weight with respect to 100 parts by weight of the total of poly-L-lactic acid and poly-D-lactic acid. In cases where the amount of the catalyst(s) is within the above-described preferred range, the effect of reducing the polymerization time can be obtained, and the molecular weight of the polylactic acid block copolymer finally obtained can be high.

The weight average molecular weight (Mw) of the mixture of the poly-L-lactic acid and poly-D-lactic acid after mixing needs to be not less than 90,000 in view of enhancement of the yield after the solid-phase polymerization. In cases where Mw is less than 90,000, the yield after the solid-phase polymerization is low, resulting in poor productivity, which is problematic. Mw is more preferably not less than 100,000, still more preferably not less than 110,000, especially preferably not less than 120,000. The yield after the solid-phase polymerization herein means the ratio of the weight of the polylactic acid block copolymer after the solid-phase polymerization with respect to the weight of the mixture before the solid-phase polymerization. More specifically, the yield after the solid-phase polymerization can be calculated according to Equation (5), wherein Wp represents the weight of the mixture before the solid-phase polymerization and Ws represents the weight of the polymer after the solid-phase polymerization.

$$Y=Ws/Wp\times 100 \quad (5)$$

The polydispersity of the mixture of poly-L-lactic acid and poly-D-lactic acid after mixing is preferably within the range of 1.5 to 4.0. The polydispersity is more preferably within the range of 2.0 to 3.7, especially preferably within the range of 2.5 to 3.5. The polydispersity herein means the ratio of the weight average molecular weight with respect to the number average molecular weight of the mixture, and is more particularly a value measured by gel permeation chromatography (GPC) using hexafluoroisopropanol or chloroform as a solvent and calculated in terms of poly(methyl methacrylate) standards.

Each of the amount of lactide and the amount of oligomers contained in poly-L-lactic acid or poly-D-lactic acid is preferably not more than 5%. The amount is more preferably not more than 3%, especially preferably not more than 1%. The amount of lactic acid contained in poly-L-lactic acid or poly-D-lactic acid is preferably not more than 2%. The amount is more preferably not more than 1%, especially preferably not more than 0.5%.

(Solid-Phase Polymerization)

The step of solid-phase polymerization of the mixture of poly-L-lactic acid and poly-D-lactic acid will now be described. In the solid-phase polymerization step, a polylactic acid block copolymer is obtained by mainly direct polymerization of poly-L-lactic acid and poly-D-lactic acid.

When the solid-phase polymerization is carried out, the form of the mixture of poly-L-lactic acid and poly-D-lactic acid is not restricted, and the mixture may be in the form of a block(s), film(s), pellet(s), powder or the like. In view of efficient promotion of the solid-phase polymerization, a pellet(s) or powder is/are preferably used. Examples of the method for forming the mixture into a pellet(s) include a method wherein the mixture is extruded into a strand-like shape and pelletized, and a method wherein the mixture is extruded into water and pelletized using an underwater cutter. Examples of the method for forming the mixture into powder include a method wherein the mixture is pulverized using a pulverizer such as a mixer, blender, ball mill or hammer mill. The method for carrying out the solid-phase polymerization step is not restricted, and either a batch method or continuous method may be employed. The reactor may be a stirring-vessel-type reactor, mixer-type reactor, column reactor or the like, and two or more types of these reactors may be used in combination.

When this solid-phase polymerization step is carried out, the mixture of poly-L-lactic acid and poly-D-lactic acid is preferably crystallized. In cases where the mixture obtained by the step of mixing poly-L-lactic acid and poly-D-lactic acid is in the crystallized state, crystallization of the mixture of poly-L-lactic acid and poly-D-lactic acid is not necessarily required for carrying out the solid-phase polymerization, but performing crystallization allows further enhancement of the efficiency of solid-phase polymerization.

The method of crystallization is not restricted, and a known method may be employed. Examples of the method include a method by maintaining the polylactic acid at a crystallization treatment temperature in the gas phase or liquid phase and a method by cooling and solidifying a molten mixture of poly-L-lactic acid and poly-D-lactic acid while carrying out the operation of stretching or shearing. In view of simplicity of the operation, the method by maintaining the polylactic acid at a crystallization treatment temperature in the gas phase or liquid phase is preferred.

The crystallization treatment temperature herein is not restricted as long as the temperature is higher than the glass-transition temperature and lower than the melting point of the polylactic acid having a lower melting point selected from the poly-L-lactic acid and the poly-D-lactic acid mixed as described above. The crystallization treatment temperature is more preferably between the heating crystallization temperature and the cooling crystallization temperature as measured with a differential scanning calorimetry (DSC) in advance.

The crystallization may be carried out under any of the conditions of reduced, normal and increased pressures.

The length of time of crystallization is not restricted, and the crystallization can be sufficiently achieved within 3 hours, and a length of time of not more than 2 hours is also preferred.

In terms of the temperature condition for carrying out the solid-phase polymerization step, the step is carried out at a temperature of not more than the melting point of the mixture of poly-L-lactic acid and poly-D-lactic acid. More specifically, the temperature is preferably not less than 100° C. and not more than 220° C., and, in view of efficient promotion of the solid-phase polymerization, the temperature is more preferably not less than 110° C. and not more than 210° C., most preferably not less than 120° C. and not more than 200° C. The melting temperature of the mixture of poly-L-lactic acid and poly-D-lactic acid herein means the lower melting point selected from the melting point derived from polylactic acid crystals and the melting point derived from stereocomplex crystals as measured with a differential scanning calorimetry (DSC) by increasing the temperature from 30° C. to 250° C. at a heating rate of 20° C./min.

For reducing the reaction time of the solid-phase polymerization, the temperature is preferably increased stepwise or continuously as the reaction proceeds. The temperature conditions for increasing the temperature stepwise during the solid-phase polymerization are preferably 120 to 145° C. for 1 to 15 hours in the first step, 135° C. to 160° C. for 1 to 15 hours in the second step, and 150° C. to 175° C. for 10 to 30 hours in the third step; more preferably 130 to 145° C. for 2 to 12 hours in the first step, from 140° C. to 160° C. for 2 to 12 hours in the second step, and within the range of 155° C. to 175° C. for 10 to 25 hours in the third step. In terms of the temperature conditions for increasing the temperature continuously during the solid-phase polymerization, the temperature is preferably increased from an initial temperature of 130° C. to 150° C. to a temperature of 150° C. to 175° C. continuously at a heating rate of 1 to 5° C./min. Further, combination of stepwise temperature increase and continuous temperature increase is also preferred in view of efficient promotion of the solid-phase polymerization.

When the solid-phase polymerization step is carried out, the step is preferably performed under reduced pressure or under the flow of an inert gas such as dry nitrogen. The degree of vacuum during the solid-phase polymerization under reduced pressure is preferably not more than 150 Pa, more preferably not more than 75 Pa, especially preferably not more than 20 Pa. The flow rate of the inert gas during the solid-phase polymerization under the flow of an inert gas is preferably 0.1 to 2,000 mL/min., more preferably 0.5 to 1,000 mL/min., especially preferably 1.0 to 500 mL/min., per 1 g of the mixture.

The yield of the polymer after the solid-phase polymerization is preferably not less than 90%. The yield is more preferably not less than 93%, especially preferably not less than 95%. The yield of the polymer herein means the ratio of the weight of the polylactic acid block copolymer after the solid-phase polymerization with respect to the weight of the mixture before the solid-phase polymerization. More specifically, the yield can be calculated according to Equation (6), wherein Wp represents the weight of the mixture before the solid-phase polymerization and Ws represents the weight of the polymer after the solid-phase $$Y=Ws/Wp \times 100 \qquad (6)$$

In the solid-phase polymerization step, the polydispersity of the mixture is preferably decreased. More specifically, the polydispersity preferably changes from a value of 1.5 to 4.0, which is for the mixture before the solid-phase polymerization, to a value of 1.5 to 2.7, which is for the polylactic acid block copolymer produced after the solid-phase polymerization. The polydispersity more preferably decreases from a value of 2.0 to 3.7, which is for the mixture before the solid-phase polymerization, to a value of 1.8 to 2.6, which is for the polylactic acid block copolymer produced after the solid-phase polymerization. The polydispersity especially preferably changes from a value of 2.5 to 3.5, which is for the mixture before the solid-phase polymerization, to a value of 2.0 to 2.5, which is for the polylactic acid block copolymer produced after the solid-phase polymerization.

(Polylactic Acid Block Copolymer)

The weight average molecular weight of the polylactic acid block copolymer obtained by the production method is not restricted, and is preferably not less than 100,000 and less than 300,000 in view of the moldability and mechanical properties. The weight average molecular weight is more preferably not less than 120,000 and less than 280,000, especially preferably not less than 140,000 and less than 260,000. The polydispersity of the polylactic acid block copolymer is preferably 1.5 to 3.0 in view of the mechanical properties. The polydispersity is more preferably 1.8 to 2.7, especially preferably 2.0 to 2.4 in view of the moldability and mechanical properties. The weight average molecular weight and the polydispersity are values measured by gel permeation chromatography (GPC) using hexafluoroisopropanol or chloroform as a solvent and calculated in terms of poly(methyl methacrylate) standards.

The average sequence length of the polylactic acid block copolymer obtained by the production method is preferably not less than 20. The average sequence length is more preferably not less than 25, especially preferably not less than 30 in view of the mechanical properties of the molded product. The average sequence length of the molded product can be calculated by $^{13}$C-NMR measurement according to Equation (7), wherein (a) represents the integrated value of the peak at about 170.1 to 170.3 ppm among the peaks of carbon belonging to carbonyl carbon and (b) represents the integrated value of the peak at about 169.8 to 170.0 ppm.

$$\text{Average sequence length}=(a)/(b) \qquad (7)$$

The polylactic acid block copolymer obtained by the production method has a melting point of 150° C. to 190° C. derived from crystals of poly-L-lactic acid alone and crystals of poly-D-lactic acid alone, and a melting point of 200 to 230° C. derived from stereocomplex crystals. The melting point derived from stereocomplex crystals is preferably 205° C. to 230° C., more preferably 210° C. to 230° C., especially preferably 215° C. to 230° C. Crystallinity can be controlled by the amount of L-lactic acid (or D-lactic acid) units contained as a major component in the poly-L-lactic acid (or poly-D-lactic acid) used as a raw material, and the higher the crystallinity, the higher the melting point derived from stereocomplex crystals, which is preferred. For example, as described above, the preferred range of L-lactic acid contained as a major component in the poly-L-lactic acid is preferably 80 mol %, more preferably not less than 90 mol %, still more preferably not less than 95 mol %, especially preferably not less than 98 mol %.

The polylactic acid block copolymer preferably has a degree of stereocomplexation (Sc) of 80 to 100% in view of the heat resistance. The degree of stereocomplexation is more preferably 85 to 100%, especially preferably 90 to 100%. The degree of stereocomplexation herein means the ratio of stereocomplex crystals with respect to the total crystals in the polylactic acid. More particularly, it can be calculated according to Equation (8), wherein ΔHl represents the amount of heat due to melting of crystals of poly-L-lactic acid alone and crystals of poly-D-lactic acid alone and ΔHh represents the amount of heat due to melting of stereocomplex crystals as measured with a differential scanning calorimetry (DSC) by increasing the temperature from 30° C. to 250° C. at a heating rate of 20° C./min.

$$Sc=\Delta Hh/(\Delta Hl+\Delta Hh)\times 100 \qquad (8)$$

The polylactic acid block copolymer obtained by the production method preferably has a cooling crystallization temperature (Tc) of not less than 130° C. in view of the moldability and the heat resistance. The cooling crystallization temperature (Tc) of a molded product means the crystallization temperature derived from polylactic acid crystals as measured with a differential scanning calorimetry (DSC) by increasing the temperature from 30° C. to 250° C. at a heating rate of 20° C./min. and then keeping the temperature constant at 250° C. for 3 minutes, followed by decreasing the temperature at a cooling rate of 20° C./min. The crystallization temperature (Tc) is not restricted, and is preferably not less than 130° C., more preferably not less than 132° C., especially preferably not less than 135° C. in view of the heat resistance and transparency.

The total number of the segment(s) composed of L-lactic acid units and the segment(s) composed of D-lactic acid units contained in each molecule of the polylactic acid block copolymer is preferably not less than 3 in view of easily achieving a high melting point by polylactic acid stereocomplex formation.

To the polylactic acid block copolymer, a catalyst deactivating agent(s) is/are preferably added after the solid-phase polymerization. In cases where a polymerization catalyst is remaining, the residual catalyst may cause thermal degradation of the polylactic acid block copolymer upon melt mixing and melt molding. By adding a catalyst deactivating agent(s), the thermal degradation can be suppressed and the thermal stability can be increased.

Examples of the catalyst deactivating agent include hindered phenol compounds, thioether compounds, vitamin compounds, triazole compounds, polyamine compounds, compounds of hydrazine derivatives and phosphorus compounds, and these may also be used in combination. Among these, at least one of phosphorus compounds is preferably contained, and the phosphorus compound(s) is/are more preferably a phosphate compound(s) and/or phosphite compound(s). Still more preferred specific examples of the compounds include "Adekastab" AX-71 (dioctadecyl phosphate), PEP-8 (distearyl pentaerythritol diphosphite) and PEP-36 (cyclic neopentatetraylbis(2,6-t-butyl-4-methylphenyl)phosphite) manufactured by ADEKA Corporation.

Specific examples of the hindered phenol compounds include n-octadecyl-3-(3',5'-di-t-butyl-4'-hydroxyphenyl)-propionate, n-octadecyl-3-(3'-methyl-5'-t-butyl-4'-hydroxyphenyl)-propionate, n-tetradecyl-3-(3',5'-di-t-butyl-4'-hydroxyphenyl)-propionate, 1,6-hexanediol-bis-[3-(3,5-di-t-butyl-4-hydroxyphenyl)-propionate], 1,4-butanediol-bis-[3-(3,5-di-t-butyl-4-hydroxyphenyl)-propionate], 2,2'-methylenebis-(4-methyl-t-butylphenol), triethylene glycol-bis-[3-(3-t-butyl-5-methyl-4-hydroxyphenyl)-propionate], tetrakis[methylene-3-(3',5'-di-t-butyl-4'-hydroxyphenyl) propionate]methane, 3,9-bis[2-{3-(3-t-butyl-4-hydroxy-5-methylphenyl)propionyloxy}-1,1-dimethylethyl]2,4,8,10-tetraoxaspiro(5,5)undecane, N,N'-bis-3-(3',5'-di-t-butyl-4'-hydroxyphenyl)propionylhexamethylenediamine, N,N'-tetramethylene-bis-3-(3'-methyl-5'-t-butyl-4'-hydroxyphenol)propionyldiamine, N,N'-bis-[3-(3,5-di-t-butyl-4-hydroxyphenol)propionyl]hydrazine, N-salicyloyl-N'-salicylidenehydrazine, 3-(N-salicyloyl)amino-1,2,4-triazole, N,N'-bis[2-{3-(3,5-di-t-butyl-4-hydroxyphenyl) propionyloxy}ethyl]oxyamide, pentaerythrityl-tetrakis[3-(3,5-di-t-butyl-4-hydroxyphenyl)propionate] and N,N'-hexamethylenebis(3,5-di-t-butyl-4-hydroxy-hydrocinnamide). Preferred examples of the hindered phenol compounds include triethylene glycol-bis-[3-(3-t-butyl-5-methyl-4-hydroxyphenyl)-propionate], tetrakis[methylene-3-(3',5'-di-t-butyl-4'-hydroxyphenyl)propionate]methane, 1,6-hexanediol-bis-[3-(3,5-di-t-butyl-4-hydroxyphenyl)-propionate], pentaerythrityl-tetrakis[3-(3,5-di-t-butyl-4-hydroxyphenyl)propionate] and N,N'-hexamethylenebis(3,5-di-t-butyl-4-hydroxy-hydrocinnamide). Specific examples of trade names of the hindered phenol compounds include "Adekastab" AO-20, AO-30, AO-40, AO-50, AO-60, AO-70, AO-80 and AO-330 manufactured by ADEKA Corporation; "Irganox" 245, 259, 565, 1010, 1035, 1076, 1098, 1222, 1330, 1425, 1520, 3114 and 5057 manufactured by Ciba Specialty Chemicals; "Sumilizer" BHT-R, MDP-S, BBM-S, WX-R, NW, BP-76, BP-101, GA-80, GM and GS manufactured by Sumitomo Chemical Co., Ltd.; and "Cyanox" CY-1790 manufactured by Saianamido Inc.

Specific examples of the thioether compounds include dilauryl thiodipropionate, ditridecyl thiodipropionate, dimyristyl thiodipropionate, distearyl thiodipropionate, pentaerythritol-tetrakis(3-laurylthiopropionate), pentaerythritol-tetrakis(3-dodecylthiopropionate), pentaerythritol-tetrakis(3-octadecylthiopropionate), and pentaerythritol-tetrakis(3-myristylthiopropionate) and pentaerythritol-tetrakis(3-stearylthiopropionate). Specific examples of trade names of the thioether compounds include "Adekastab" AO-23, AO-412S and AO-503A manufactured by ADEKA Corporation; "Irganox" PS802 manufactured by Ciba Specialty Chemicals; "Sumilizer" TPL-R, TPM, TPS and TP-D manufactured by Sumitomo Chemical Co., Ltd.; DSTP, DLTP, DLTOIB and DMTP manufactured by API Corporation; "Seenox" 412S manufactured by Shipro Kasei Kaisha, Ltd.; and "Cyanox" 1212 manufactured by Saianamido Inc.

Specific examples of the polyamine compounds include 3,9-bis[2-(3,5-diamino-2,4,6-triazaphenyl)ethyl]-2,4,8,10-tetraoxaspiro[5.5]undecane, ethylenediamine-tetraacetic acid, alkali metal (Li, Na, K) salts of ethylenediamine-tetraacetic acid, N,N'-disalicylidene-ethylenediamine, N,N'-disalicylidene-1,2-propylenediamine, N,N"-disalicylidene-N'-methyl-dipropylenetriamine and 3-salicyloylamino-1,2,4-triazole.

Specific examples of the compounds of hydrazine derivatives include decamethylenedicarboxylic acid-bis(N'-salicyloyl-hydrazide), isophthalic acid bis(2-phenoxypropionylhydrazide), N-formyl-N'-salicyloylhydrazine, 2,2-oxamidobis-[ethyl-3-(3,5-di-t-butyl-4-hydroxyphenyl)propionate], oxalyl-bis-benzylidene-hydrazide, nickel-bis(1-phenyl-3-methyl-4-decanoyl-5-pyazolate), 2-ethoxy-2'-ethyloxanilide, 5-t-butyl-2-ethoxy-2'-ethyloxanilide, N,N-diethyl-N',N'-diphenyloxamide, N,N'-diethyl-N,N'-diphenyloxamide, oxalic acid-bis(benzylidenehydrazide), thiodipropionic acid-bis(benzylidenehydrazide), bis(salicyloylhydrazine), N-salicylidene-N'-salicyloylhydrazone, N,N'-bis[3-(3,5-di-t-butyl-4-hydroxyphenyl)propionyl]hydrazine and N,N'-bis[2-{3-(3,5-di-t-butyl-4-hydroxyphenyl)propionyloxy}ethyl] oxamide.

Examples of the phosphorus compounds include phosphite compounds and phosphate compounds. Specific examples of the phosphite compounds include tetrakis[2-t-butyl-4-thio(2'-methyl-4'-hydroxy-5'-t-butylphenyl]-5-methylphenyl]-1, 6-hexamethylene-bis(N-hydroxyethyl-N-methylsemicarbazide)-diphosphite, tetrakis[2-t-butyl-4-thio(2'-methyl-4'-hydroxy-5'-t-butylphenyl)-5-methylphenyl]-1,10-decamethylene-di-carboxylic acid-di-hydroxyethylcarbonylhydrazide-diphosphite, tetrakis[2-t-butyl-4-thio(2'-methyl-4'-hydroxy-5'-t-butylphenyl)-5-methylphenyl]-1,10-decamethylene-di-carboxylic acid-di-salicyloylhydrazide-diphosphite, tetrakis[2-t-butyl-4-thio(2'-methyl-4'-hydroxy-5'-t-butylphenyl)-5-methylphenyl]-di(hydroxyethylcarbonyl)hydrazide-diphosphite and tetrakis[2-t-butyl-4-thio(2'-methyl-4'-hydroxy-5'-t-butylphenyl)-5-methylphenyl]-N,N'-bis(hydroxyethyl)oxamide-diphosphite. Those having at least one P—O bond linked to an aromatic group(s) are more preferred, and specific examples of such phosphite compounds include tris(2,4-di-t-butylphenyl)phosphite, tetrakis(2,4-di-t-butylphenyl)4,4'-biphenylenephosphonite, bis(2,4-di-t-butylphenyl)pentaerythritol-di-phosphite, bis(2,6-di-t-butyl-4-methylphenyl)pentaerythritol-di-phosphite, 2,2-methylenebis(4,6-di-t-butylphenyl)octylphosphite, 4,4'-butylidene-bis(3-methyl-6-t-butylphenyl-di-tridecyl)phosphite, 1,1,3-tris(2-methyl-4-ditridecylphosphite-5-t-butylphenyl)butane, tris(mixed mono- and di-nonylphenyl)phosphite, tris(nonylphenyl) phosphite and 4,4'-isopropylidenebis(phenyl-dialkylphosphite). Tris(2,4-di-t-butylphenyl)phosphite, 2,2-methylenebis(4,6-di-t-butylphenyl)octylphosphite, bis(2,6-di-t-butyl-4-methylphenyl)pentaerythritol-di-phosphite, tetrakis(2,4-di-t-butylphenyl)-4,4'-biphenylenephosphonite and the like may be preferably used. Specific examples of trade names of the phosphite compounds include "Adekastab" C, PEP-4C, PEP-8, PEP-11C, PEP-24G, PEP-36, HP-10, 2112, 260, 522A, 329A, 1178, 1500, C, 135A, 3010 and TPP manufactured by ADEKA Corporation; "Irgafos" 168 manufactured by Ciba Specialty Chemicals; "Sumilizer" P-16 manufactured by Sumitomo Chemical Co., Ltd.; "Sandostab" PEPQ manufactured by Clarinat International Ltd.; and "Weston" 618, 619G and 624 manufactured by GE.

Specific examples of the phosphate compounds include monostearyl acid phosphate, distearyl acid phosphate, methyl acid phosphate, isopropyl acid phosphate, butyl acid phosphate, octyl acid phosphate and isodecyl acid phosphate, and, among these, monostearyl acid phosphate and distearyl acid phosphate are preferred. Specific examples of trade names of the phosphate compounds include "Irganox" MD 1024 manufactured by Ciba Specialty Chemicals; "Inhibitor" OABH manufactured by Eastman Kodak; and "Adekastab" CDA-1, CDA-6 and AX-71 manufactured by ADEKA Corporation.

The amount of the catalyst deactivating agent to be added is not restricted, and is preferably 0.001 to 2 parts by weight, more preferably 0.01 to 1 part by weight, still more preferably 0.05 to 0.5 part by weight, most preferably 0.08 to 0.3 part by weight with respect to 100 parts by weight of the polylactic acid block copolymer in view of the thermal stability. The timing of addition of the catalyst deactivating agent is not restricted, and the agent may be added in any of the polylactic acid production step, polylactic acid mixing step and solid-phase polymerization step. In view of obtaining a polylactic acid block copolymer having a high melting point and a high molecular weight, the agent is preferably added in the polylactic acid production step and polylactic acid mixing step. In view of the productivity, the agent is more preferably added immediately before completion of the polylactic acid production step and/or at the beginning of the polylactic acid mixing step, still more preferably added both immediately before completion of the polylactic acid production step and at the beginning of the polylactic acid mixing. In cases where the catalyst deactivating agent is added at the beginning of the polylactic acid mixing, the catalyst deactivating agent is preferably added before addition of the catalyst for solid-phase polymerization. The catalyst deactivating agent is preferably added in each of the polylactic acid production step and polylactic acid mixing step preferably in an amount of 0.001 to 1 part by weight in view of the thermal stability, or more preferably in an amount of 0.01 to 0.5 part by weight, still more preferably in an amount of 0.01 to 0.1 part by weight in view of the productivity, with respect to 100 parts by weight of the polylactic acid block copolymer. Further, it is also preferred to add the agent after completion of the solid-phase polymerization in view of the thermal stability.

To the polylactic acid block copolymer obtained by the production method, one or more of normal additives such as fillers (glass fibers, carbon fibers, metal fibers, natural fibers, organic fibers, glass flakes, glass beads, ceramic fibers, ceramic beads, asbestos, wollastonite, talc, clay, mica, sericite, zeolite, bentonite, montmorillonite, synthetic mica, dolomite, kaolin, silicic acid fine powder, feldspar powder, potassium titanate, shirasu balloon, calcium carbonate, magnesium carbonate, barium sulfate, calcium oxide, aluminum oxide, titanium oxide, aluminum silicate, silicon oxide, plaster, novaculite, dawsonite, white clay and the like), ultraviolet absorbers (resorcinol, salicylate, benzotriazole, benzophenone and the like), heat stabilizers (hindered phenol, hydroquinone, phosphites and substituted bodies thereof, and the like), lubricants, releasing agents (montanic acid and salts thereof, esters thereof and half esters thereof, stearyl alcohol, stearamide, polyethylene wax and the like), coloring agents including dyes (nigrosine and the like) and pigments (cadmium sulfide, phthalocyanine and the like), color-protection agents (phosphites, hypophosphates and the like), flame retardants (red phosphorus, phosphoric acid esters, brominated polystyrene, brominated polyphenylene ether, brominated polycarbonate, magnesium hydroxide, melamine, cyanuric acid and salts thereof, silicon compounds and the like), conducting agents or coloring agents (carbon black and the like), sliding property improving agents (graphite, fluorine resins and the like), nuclear agents (inorganic nuclear agents including talc; organic amide compounds including ethylenebislauric acid amide, ethylenebis-12-dihydroxystearic acid amide and trimellitic acid tricyclohexylamide; pigment nucleating agents including copper phthalocyanine and Pigment Yellow 110; organic carboxylic acid metal salts; phenylphosphonic acid zinc; and the like) and antistatic agents may be added as long as the object is not adversely affected.

The polylactic acid block copolymer obtained by the production method may additionally comprise at least one of other thermoplastic resins (polyethylene, polypropylene, polystyrene, acrylic resins, acrylonitrile/butadiene/styrene copolymers, polyamide, polycarbonate, polyphenylene sulfide resins, polyether ether ketone resins, polyester, polysulfone, polyphenylene oxide, polyacetal, polyimide, polyetherimide, cellulose esters and the like), thermosetting resins (phenol resins, melamine resins, polyester resins, silicone resins, epoxy resins and the like), soft thermoplastic resins (ethylene/glycidyl methacrylate copolymers, polyester elastomers, polyamide elastomers, ethylene/propylene terpolymers, ethylene/butene-1 copolymers and the like) and the like as long as the object is not adversely affected.

In cases where an acrylic resin is used, preferred examples of the resin generally include acrylic resins comprising as a major component (meta)alkyl acrylate units having a $C_1$-$C_4$ alkyl group(s). Further, the (meta)alkyl acrylate having a $C_1$-$C_4$ alkyl group(s) may be copolymerized with another alkyl acrylate having a $C_1$-$C_4$ alkyl group(s) or aromatic vinyl compound such as styrene.

Examples of the (meta)alkyl acrylate having an alkyl group(s) include methyl acrylate, methyl methacrylate, ethyl acrylate, ethyl methacrylate, butyl acrylate, butyl methacrylate, cyclohexyl acrylate and cyclohexyl methacrylate. In cases where an acrylic resin is used, the acrylic resin is especially preferably polymethyl methacrylate composed of methyl methacrylate.

The polylactic acid block copolymer obtained by the production method has a property that easily allow formation of a polylactic acid stereocomplex having a high melting point even after heat melting and solidification upon processing of the block copolymer into a molded article or the like.

In the method for producing a polylactic acid block copolymer, a molded product comprising the obtained polylactic acid block copolymer preferably satisfies Inequality (9) and has a haze value of not more than 30% when the thickness of the molded product is 100 µm.

$$\text{Relative degree of crystallinity}=[(\Delta Hm-\Delta Hc)/\Delta Hm]\times 100>90 \quad (9)$$

In this inequality, $\Delta Hm$ represents the melting enthalpy of crystals in the molded product (J/g), and $\Delta Hc$ represents the crystallization enthalpy of crystals in the molded product upon temperature increase (J/g).

The relative degree of crystallinity is preferably higher than 90%, more preferably not less than 92%, especially preferably not less than 94%. $\Delta Hc$ herein means the crystallization enthalpy of crystals in the molded product as measured with differential scanning calorimeter (DSC) upon temperature increase at a heating rate of 20° C./min. $\Delta Hm$ means the crystal melting enthalpy of crystals in the molded product as measured with DSC at a heating rate of 20° C./min., which the melting enthalpy of crystals as measured by increasing the temperature at a heating rate of 20° C./min. from 30° C. to 250° C. during the first temperature increase and then decreasing the temperature at a cooling rate of 20° C./min. to 30° C., further followed by increasing the temperature at a heating rate of 20° C./min. from 30° C. to 250° C. during the second temperature increase.

The haze value means a value obtained by measurement according to JIS K 7105 with a molded product having a thickness of 100 µm, and, in view of the transparency, the haze value is preferably not more than 30%, more preferably not more than 10%. The lower limit is not restricted, and the molded product can be practically used without any problem in cases where the haze value is not less than 0.1%.

In the method for producing a polylactic acid block copolymer, a molded product comprising the obtained polylactic acid block copolymer preferably has a relative degree of crystallinity of more than 90%, and a haze value of not more than 30% when the thickness of the molded product is 500 µm. The haze value is preferably not more than 20%, more preferably not more than 15%, still more preferably not more than 10%, still more preferably not more than 7%, especially preferably not more than 5% in view of the transparency. The lower limit is not restricted, and the value is 0% or higher.

In the method for producing a polylactic acid block copolymer, a molded product comprising the obtained polylactic acid block copolymer preferably has a relative degree of crystallinity of more than 90% even in cases where a nuclear agent for enhancement of the transparency is not contained, and has a haze value of not more than 30% when the thickness of the molded product is 1 mm. The haze value is preferably not more than 20%, more preferably not more than 15%, still more preferably not more than 10%, still more preferably not more than 7%, especially preferably not more than 5% in view of the transparency.

In the method for producing a polylactic acid block copolymer, the polylactic acid block copolymer contained in a molded product comprising the obtained polylactic acid block copolymer preferably has a cooling crystallization temperature (Tc) of not less than 130° C. in view of the heat resistance. The cooling crystallization temperature (Tc) of the molded product means the crystallization temperature derived from polylactic acid crystals as measured with a differential scanning calorimetry (DSC) by increasing the temperature from 30° C. to 250° C. at a heating rate of 20° C./min. and then keeping the temperature constant at 250° C. for 3 minutes, followed by decreasing the temperature at a cooling rate of 20° C./min. The crystallization temperature (Tc) is not restricted, and is preferably not less than 130° C., more preferably not less than 132° C., especially preferably not less than 135° C. in view of the heat resistance and transparency.

The polylactic acid block copolymer contained in a molded product comprising the polylactic acid block copolymer has a degree of stereocomplexation (Sc) of preferably not less than 80%, more preferably not less than 70%, still more preferably 75 to 100%, especially preferably 90 to 100%. The degree of stereocomplexation herein means the ratio of stereocomplex crystals with respect to the total crystals in the polylactic acid. More particularly, it can be calculated according to Equation (10), wherein $\Delta Hl$ represents the heat of fusion of crystals of poly-L-lactic acid alone and crystals of poly-D-lactic acid alone and $\Delta Hh$ represents the heat of fusion of stereocomplex crystals as measured with a differential scanning calorimetry (DSC).

$$Sc=\Delta Hh/(\Delta Hl+\Delta Hh)\times 100 \quad (10)$$

The polylactic acid block copolymer contained in a molded product comprising the polylactic acid block copolymer preferably has a total number of the segment(s) composed of L-lactic acid units and segment(s) composed of D-lactic acid units of not less than 3 per one molecule of the polylactic acid block copolymer in view of the fact that a polylactic acid block copolymer with which a polylactic acid stereocomplex having a high melting point is likely to be formed can be obtained. The molecular weight per segment is preferably 2,000 to 50,000. The molecular weight per segment is more preferably 4,000 to 45,000, especially preferably 5,000 to 40,000 in view of the mechanical properties.

The polylactic acid block copolymer contained in a molded product comprising the polylactic acid block copolymer preferably has an average sequence length of not less than 20. The average sequence length is more preferably not less than 25, especially preferably not less than 30 in view of the mechanical properties of the molded product. The average sequence length of the molded product can be calculated by $^{13}$C-NMR measurement according to the Equation (11) below, wherein (a) represents the integrated value of the peak at about 170.1 to 170.3 ppm among the peaks of carbon belonging to carbonyl carbon and (b) represents the integrated value of the peak at about 169.8 to 170.0 ppm.

$$\text{Average sequence length} = (a)/(b) \quad (11)$$

The weight average molecular weight of the polylactic acid block copolymer contained in a molded product comprising the polylactic acid block copolymer obtained by the method for producing a polylactic acid block copolymer is not restricted, and the weight average molecular weight is preferably not less than 100,000 and less than 300,000 in view of the mechanical properties. The weight average molecular weight is more preferably not less than 120,000 and less than 280,000, especially preferably not less than 140,000 and less than 260,000 in view of the moldability and the mechanical properties. The polydispersity of the polylactic acid block copolymer contained in a molded product comprising the polylactic acid block copolymer is preferably 1.5 to 3.0 in view of the mechanical properties. The polydispersity is more preferably 1.8 to 2.7, especially preferably 2.0 to 2.4 in view of the moldability and the mechanical properties. The weight average molecular weight and the polydispersity are values which are measured by gel permeation chromatography (GPC) using hexafluoroisopropanol or chloroform as a solvent and calculated in terms of poly(methyl methacrylate) standards.

The polylactic acid resin composition constituting a molded product comprising the polylactic acid block copolymer is preferably a polylactic acid resin composition comprising at a ratio of not less than 60% the polylactic acid block copolymer constituted by a segment(s) composed of L-lactic acid units and segment(s) composed of D-lactic acid units. The ratio is more preferably not less than 70%, especially preferably not less than 80%.

Each of the amount of lactide and the amount of oligomers contained in the polylactic acid resin composition contained in a molded product comprising the obtained polylactic acid block copolymer is preferably not more than 5%. The amount is more preferably not more than 3%, especially preferably not more than 1%. The amount of lactic acid contained in the poly-L-lactic acid or poly-D-lactic acid is preferably not more than 2%. The amount is more preferably not more than 1%, still more preferably not more than 0.5%, especially preferably not more than 0.1%.

Examples of the method for producing a molded product comprising the polylactic acid block copolymer obtained by the method for producing a polylactic acid block copolymer include known molding methods such as sheet forming, injection molding, extrusion molding, blow forming, vacuum forming and press forming. In view of the transparency and heat resistance, injection molding, blow forming, vacuum forming and press forming are preferred.

In cases where sheet forming is carried out as the method for producing a molded product, examples of the method include a method in which a molten polylactic acid resin composition comprising the polylactic acid block copolymer is extruded through a die having a predetermined thickness to obtain a sheet, and a method in which a molten polylactic acid resin composition comprising the polylactic acid block copolymer is sandwiched between predetermined metal molds to obtain a sheet. Further, the obtained sheet may be subjected to heat treatment at a predetermined temperature for a predetermined length of time to increase the degree of crystallinity. Specific examples of the production method include a method in which melting at 240° C. for 2 minutes is followed by pressing at a press metal mold temperature of 80° C. to prepare a press sheet having a thickness of 100 µm, which is then subjected to heat treatment under a nitrogen atmosphere at 110° C. for 30 minutes, and a method in which melting under heat at 240° C. for 2 minutes is followed by pressing at a press temperature of 40° C. to prepare a press sheet having a thickness of 1 mm, which is then subjected to heat treatment under a nitrogen atmosphere at 80° C. for 5 minutes and at 110° C. for 30 minutes.

In cases where injection molding is carried out as the method for producing a molded product, in view of the transparency and heat resistance, the mold temperature is preferably set within the temperature range from the glass-transition temperature to the melting point of the polylactic acid block copolymer, more preferably 60° C. to 220° C., still more preferably 70° C. to 200° C., still more preferably 80° C. to 180° C., and each molding cycle in the injection molding is preferably operated for not more than 150 seconds, more preferably not more than 90 seconds, still more preferably not more than 60 seconds, still more preferably not more than 50 seconds.

In cases where blow forming is carried out as the method for producing a molded product, examples of the method include a method in which the polylactic acid block copolymer is molded by injection molding according to the above method into a closed-end tubular molded product (parison) having a degree of crystallinity that allows blow forming, and transferred to a metal mold for blow forming whose temperature was set from the glass-transition temperature to the glass-transition temperature+80° C., preferably from 60° C. to 140° C., more preferably from 70° C. to 130° C., followed by stretching with a stretching rod while compressed air is supplied from an air nozzle, to obtain a molded product.

In cases where vacuum forming is carried out as the method for producing a molded product, examples of the method include a method in which a sheet or film having a degree of crystallinity that allows molding is once obtained and the sheet or film is then heated with a heater such as a hot plate or hot air to 60° C. to 150° C., preferably 65° C. to 120° C., more preferably 70° C. to 90° C., followed by bringing the sheet into close contact with a metal mold which was set to a mold temperature of 30 to 150° C., preferably 40° C. to 100° C., more preferably 50° C. to 90° C. while the pressure inside the metal mold is reduced, to perform molding.

In cases where press forming is carried out as the method for producing a molded product, examples of the method include a method in which a sheet or film having a degree of crystallinity that allows molding is once obtained and the polylactic acid block copolymer is then heated with a heater such as a hot plate or hot air to 60° C. to 150° C., preferably 65° C. to 120° C., more preferably 70° C. to 90° C., followed by bringing the sheet into close contact with a metal mold composed of a male mold and female mold which was set to a mold temperature of 30 to 150° C., preferably 40° C. to 100° C., more preferably 50° C. to 90° C., and pressurizing the sheet to perform mold clamping.

In the method for producing a polylactic acid block copolymer, the molded product comprising the obtained polylactic acid block copolymer has transparency even in cases where stretching treatment was not carried out, so that it is not necessary to perform stretching treatment to give transparency to the product. However, it is also possible to perform stretching treatment as required. The shape of the molded product to be subjected to stretching treatment is preferably a film or a sheet. In cases where the stretching treatment is performed, stretching is preferably carried out within the range from the glass-transition temperature to the melting point of the polylactic acid stereocomplex, more preferably 60° C. to 170° C., still more preferably 70° C. to 150° C.

The polylactic acid block copolymer obtained by the method for producing a polylactic acid block copolymer can be molded into a film, sheet, fiber/cloth, non-woven fabric, injection-molded article, extrusion-molded article, vacuum pressure-molded article, blow-molded article, complex with another/other material(s), and the like, and are useful for uses such as agricultural materials, garden materials, fishery materials, civil engineering and construction materials, stationery, medical supplies, automobile parts, electrical/electronic components and optical films.

Specific examples of the uses include electrical/electronic components such as relay cases, coil bobbins, optical pickup chassis, motor cases, housings and internal parts for laptop computers, housings and internal parts for CRT displays, housings and internal parts for printers, housings and internal parts for mobile terminals including mobile phones, mobile computers and handheld-type mobiles, housings and internal parts for recording media (e.g., CD, DVD, PD and FDD) drives, housings and internal parts for copiers, housings and internal parts for facsimile devices, and parabolic antennas. Further examples of the uses include parts for home and office electric appliances such as VTR parts, television parts, iron parts, hair driers, rice cooker parts, microwave oven parts, acoustic parts, parts for video equipments including video cameras and projectors, substrates for optical recording media including Laser discs (registered trademark), compact discs (CDs), CD-ROM, CD-R, CD-RW, DVD-ROM, DVD-R, DVD-RW, DVD-RAM and Blu-ray disks, illumination parts, refrigerator parts, air conditioner parts, typewriter parts and word processor parts. The polylactic acid block copolymer and the molded product comprising the polylactic acid block copolymer are also useful for, for example, housings and internal parts for electronic musical instruments, home game machines and portable game machines; electrical/electronic components such as various gears, various cases, sensors, LEP lamps, connectors, sockets, resistors, relay cases, switches, coil bobbins, condensers, cases for variable condensers, optical pickups, oscillators, various terminal blocks, transformers, plugs, printed circuit boards, tuners, speakers, microphones, headphones, small motors, magnetic head bases, power modules, semiconductors, liquid crystals, FDD carriages, FDD chassis, motor brush holders, transformer members and coil bobbins; building components such as sash rollers, blind curtain parts, pipe joints, curtain liners, blind parts, gas meter parts, water meter parts, water heater parts, roof panels, adiabatic walls, adjusters, plastic floor posts, ceiling hangers, stairs, doors and floors; fishery-related members such as bait bags; civil engineering-related members such as vegetation nets, vegetation mats, weed control bags, weed control nets, curing sheets, slope protection sheets, fly ash-preventing sheet, drain sheets, water retention sheets, sludge/slime dewatering bags and concrete molds; underhood parts for automobiles such as air flow meters, air pumps, thermostat housings, engine mounts, ignition bobbins, ignition cases, clutch bobbins, sensor housings, idle speed control bulbs, vacuum switching bulbs, ECU (Electric Control Unit) housings, vacuum pump cases, inhibitor switches, rotation sensors, acceleration sensors, distributor caps, coil bases, ABS actuator cases, the top and the bottom of radiator tanks, cooling fans, fan shrouds, engine covers, cylinder head covers, oil caps, oil pans, oil filters, fuel caps, fuel strainers, distributor caps, vapor canister housings, air cleaner housings, timing belt covers, brake booster parts, various cases, various tubes, various tanks, various hoses, various clips, various valves and various pipes; interior parts for automobiles such as torque control levers, safety belt parts, register blades, washer levers, window regulator handles, knobs for window regulator handles, passing light levers, sun visor brackets and various motor housings; exterior parts for automobiles such as roof rails, fenders, garnishes, bumpers, door mirror stays, spoilers, hood louvers, wheel covers, wheel caps, grill apron cover frames, lamp reflectors, lamp bezels and door handles; various automobile connectors such as wire harness connectors, SMJ connectors (connectors for trunk connection), PCB connectors (board connectors) and door grommet connectors; machine parts such as gears, screws, springs, bearings, levers, key stems, cams, ratchets, rollers, water-supply parts, toy parts, fans, fishing guts, pipes, washing jigs, motor parts, microscopes, binoculars, cameras and watches; agricultural members such as multi-films, tunnel films, bird-preventing sheets, pots for raising seedlings, vegetation piles, seeding strings/tapes, sheets for sprouting, inner sheets for greenhouses, stoppers for agricultural vinyl sheets, slow-releasing fertilizer, root barriers, gardening nets, insect-preventing nets, nets for young trees, print laminates, fertilizer bags, sample bags, sandbags, protection nets against mammalian pests, strands for training, and windshield nets; sanitary supplies; medical supplies such as medical films; packaging films for calendars, stationery, clothing and food; vessels and tableware such as trays, blisters, knives, forks, spoons, tubes, plastic cans, pouches, containers, tanks and baskets; containers and wrappings such as hot-fill containers, containers for microwave oven cooking, containers for cosmetics, wrapping films, foam buffers, paper laminates, shampoo bottles, beverage bottles, cups, candy wrappings, shrink labels, lid materials, windowed envelopes, baskets for fruits, tearable tapes, easy-peel wrappings, egg packs, HDD wrappings, compost bags, recording media wrappings, shopping bags, and wrapping films for electric and electronic parts; various types of clothing; interior goods; carrier tapes; print laminates; thermal stencil printing films; mold releasing films; porous films; container bags; credit cards; cash cards; ID cards; IC cards; optical elements; electroconductive embossed tapes; IC trays; golf tees; garbage bags; shopping bags; various nets; tooth brushes; stationery; plastic folders; bags; chairs; tables; cooler boxes; rakes; hose reels; planters; hose nozzles; surfaces of dining tables and desks; furniture panels; kitchen cabinets; pen caps; and gas lighters.

EXAMPLES

Our methods will now be described more specifically by way of Examples. The number of parts in Examples herein represents parts by weight. The methods of measurement of physical properties and the like were as follows. The measurement was carried out for the same selected sites of molded products.

(1) Molecular Weight and Polydispersity

The weight average molecular weight and the polydispersity are values which are measured by gel permeation chromatography (GPC) and calculated in terms of poly(methyl methacrylate) standards. The measurement by GPC was carried out using: as a detector, WATERS 410, which is a differential refractometer manufactured by WATERS; as a pump, MODEL 510 manufactured by WATERS; and, as a column, Shodex GPC HFIP-806M and Shodex GPC HFIP-LG which are linearly connected. In terms of the conditions for the measurement, the flow rate was 0.5 mL/min.; hexafluoroisopropanol was used as a solvent; and 0.1 mL of a solution having a sample concentration of 1 mg/mL was injected.

(2) Melting Point, Melting Temperature and Heat of Fusion of Crystals

The melting point, the end of melting point and the heat of fusion of crystals were measured with a differential scanning calorimetry (DSC) manufactured by Perkin-Elmer Corp. In terms of the measurement conditions, measurement was carried out with 5 mg of the sample under a nitrogen atmosphere at a heating rate of 20° C./min.

The melting point herein means the temperature at the peak top of the peak due to melting of crystals, and the end of melting point means the temperature at the end of the peak due to melting of crystals. In the obtained results, a melting point of not less than 190° C. and less than 250° C. was judged to be due to formation of a polylactic acid stereocomplex, and a melting point of not less than 150° C. and less than 190° C. was judged to be due to nonoccurrence of formation of a polylactic acid stereocomplex. The melting point of the mixture herein means the melting point measured by increasing the temperature at a heating rate of 20° C./min. from 30° C. to 250° C. in the first temperature increase, and the melting point of the polylactic acid block copolymer after solid-phase polymerization means the melting point measured by increasing the temperature at a heating rate of 20° C./min. from 30° C. to 250° C. during the first temperature increase and then decreasing the temperature at a cooling rate of 20° C./min. to 30° C., further followed by increasing the temperature at a heating rate of 20° C./min. from 30° C. to 250° C. during the second temperature increase.

(3) Degree of Stereocomplexation (Sc)

The degrees of stereocomplexation (Sc) of the polylactic acid block copolymer and polylactic acid stereocomplex (mixture of poly-L-lactic acid and poly-D-lactic acid) were calculated according to Equation (12):

$$Sc = \Delta Hh / (\Delta Hl + \Delta Hh) \times 100 \quad (12)$$

(wherein $\Delta Hl$ represents the amount of heat due to melting of crystals of poly-L-lactic acid alone and crystals of poly-D-lactic acid alone, which appears at not less than 150° C. and less than 190° C., and $\Delta Hh$ represents the amount of heat due to melting of stereocomplex crystals, which appears at not less than 190° C. and less than 250° C.).

The degree of stereocomplexation in the mixture was calculated for the peak due to melting of crystals measured with a differential scanning calorimetry (DSC) during the first temperature increase, and the degree of stereocomplexation of the polylactic acid block copolymer after solid-phase polymerization was calculated for the peak due to melting of crystals measured by increasing the temperature at a heating rate of 20° C./min. from 30° C. to 250° C. during the first temperature increase and then decreasing the temperature at a cooling rate of 20° C./min. to 30° C., further followed by increasing the temperature at a heating rate of 20° C./min. from 30° C. to 250° C. during the second temperature increase.

(4) Yield of Polymer

The yield (Y) of the polylactic acid block copolymer was calculated according to Equation (13):

$$Y = Ws/Wp \times 100 \quad (13)$$

(wherein Wp represents the weight of the mixture before solid-phase polymerization, and Ws represents the weight of the polylactic acid block copolymer after solid-phase polymerization).

(5) Cooling Crystallization Temperature of Polymer

The cooling crystallization temperatures of the polylactic acid block copolymer and the mixture of poly-L-lactic acid and poly-D-lactic acid were measured with a differential scanning calorimetry (DSC) manufactured by Perkin-Elmer Corp. More specifically, the temperature of 5 mg of each sample was increased with a differential scanning calorimetry (DSC) under a nitrogen atmosphere at a heating rate of 20° C./min from 30° C. to 250° C., and the temperature was then kept constant at 250° C. for 3 minutes, followed by decreasing the temperature at a cooling rate of 20° C./min. while measuring the temperature at the crystallization peak top. The measured temperature was defined as the cooling crystallization temperature.

(6) Relative Degree of Crystallinity

In terms of the relative degrees of crystallinity of the polylactic acid block copolymer and the mixture of poly-L-lactic acid and poly-D-lactic acid, $\Delta Hm$, which represents the total of the melting enthalpy derived from crystals of poly-L-lactic acid alone and crystals of poly-D-lactic acid alone and the melting enthalpy of stereocomplex crystals in the molded product, and $\Delta Hc$, which represents the crystallization enthalpy during the temperature increase of the molded product, were measured with a differential scanning calorimetry (DSC) manufactured by Perkin-Elmer Corp., and calculation was carried out according to Equation (14):

$$\text{Relative degree of crystallinity} = [(\Delta Hm - \Delta Hc)/\Delta Hm] \times 100 \quad (14).$$

(7) Haze Value

As an index of transparency of the molded product, the haze value was measured. A sheet-shaped molded product having a thickness of 0.1 mm was subjected to measurement of the haze value using a haze meter NDH-300A manufactured by Nippon Denshoku Industries, according to JIS K 7105.

(8) Storage Modulus

As an index of heat resistance of the molded product, the storage modulus was measured. The central portion of a sheet-shaped molded product having a thickness of 0.1 mm was cut into a piece having a size of 40 mm×2 mm to provide a strip-shaped sample, and the sample was subjected to measurement of the dynamic viscoelasticity using a Dynamic viscoelasticity apparatus (DMS6100 manufactured by Seiko Instruments Inc.) under a nitrogen atmosphere at a heating rate of 2° C./min. at a frequency of 3.5 Hz, to measure the storage modulus at 130° C. It can be said that the higher the modulus, the higher the heat resistance.

(9) Tensile Strength

The central portion of a sheet-shaped molded product having a thickness of 0.1 mm was cut into a piece having a size of 40 mm×2 mm to provide a strip-shaped sample, and the sample was subjected to measurement of the tensile strength according to ASTM D882.

(10) Impact Resistance

In a container obtained by vacuum forming of a sheet-shaped molded product having a thickness of 0.1 mm, water was placed, and the lid of the container was closed. The container was then dropped onto concrete from a height of 2 m with its bottom facing downward. The number of times of this operation was counted until the container was broken due to the drop impact to cause leakage of water, and evaluation was carried out by the method described below:

A: The number of times of dropping counted until the container was broken to cause leakage of water was not less than 5;

B: The number of times of dropping counted until the container was broken to cause leakage of water was 2 to 4; and F: The number of times of dropping counted until the container was broken to cause leakage of water was 1.

Reference Example 1

In a reaction vessel equipped with an agitator and a reflux condenser, 50 parts of 90% aqueous L-lactic acid solution was placed, and the temperature was adjusted to 150° C., followed by allowing the reaction to proceed while gradually decreasing the pressure to evaporate water for 3.5 hours. Thereafter, the pressure was adjusted to normal pressure under a nitrogen atmosphere, and 0.02 part of stannous acetate was added, followed by allowing polymerization reaction to proceed while gradually decreasing the pressure to 13 Pa at 170° C. for 7 hours, to obtain poly-L-lactic acid (PLA1). The weight average molecular weight of PLA1 was 18,000; the polydispersity was 1.5; the melting point was 149° C.; and the end of melting point was 163° C.

Reference Example 2

PLA1 obtained in Reference Example 1 was subjected to crystallization treatment under a nitrogen atmosphere at 110° C. for 1 hour, and then to solid-phase polymerization under a pressure of 60 Pa at 140° C. for 3 hours, 150° C. for 3 hours and then 160° C. for 5 hours, to obtain poly-L-lactic acid (PLA2). The weight average molecular weight of PLA2 was 43,000; the polydispersity was 1.8; the melting point was 159° C.; and the end of melting point was 176° C.

Reference Example 3

PLA1 obtained in Reference Example 1 was subjected to crystallization treatment under a nitrogen atmosphere at 110° C. for 1 hour, and then to solid-phase polymerization under a pressure of 60 Pa at 140° C. for 3 hours, at 150° C. for 3 hours and then at 160° C. for 12 hours, to obtain poly-L-lactic acid (PLA3). The weight average molecular weight of PLA3 was 137,000; the polydispersity was 1.8; the melting point was 168° C.; and the end of melting point was 189° C.

Reference Example 4

PLA1 obtained in Reference Example 1 was subjected to crystallization treatment under a nitrogen atmosphere at 110° C. for 1 hour, and then to solid-phase polymerization under a pressure of 60 Pa at 140° C. for 3 hours, at 150° C. for 3 hours and then at 160° C. for 18 hours, to obtain poly-L-lactic acid (PLA4). The weight average molecular weight of PLA4 was 203,000; the polydispersity was 1.9; the melting point was 170° C.; and the end of melting point was 189° C.

Reference Example 5

In a reaction vessel equipped with an agitator, 50 parts of L-lactide was placed and uniformly melted under a nitrogen atmosphere at 120° C., followed by changing the temperature to 150° C. and adding 0.003 part of stannous octoate. The reaction was allowed to proceed for 2 hours to obtain poly-L-lactic acid (PLA5). The weight average molecular weight of PLA5 was 262,000; the polydispersity was 2.1; the melting point was 171° C.; and the end of melting point was 191° C.

Reference Example 6

Water was distilled from 1 kg of 90 wt % aqueous L-lactic acid solution by stirring the solution at 150° C. at 4,000 Pa for 6 hours, to achieve oligomerization. To this oligomer, 0.2 g of tin(II) chloride and 0.2 g of p-toluenesulfonic acid were added, and melt polymerization was carried out at 180° C. at 1,300 Pa for 6 hours, to obtain a poly-L-lactic acid prepolymer. This prepolymer solid was pulverized and subjected to solid-phase polymerization at 140° C. for 30 hours, to obtain poly-L-lactic acid (PLA6). The weight average molecular weight of PLA6 was 154,000; the polydispersity was 2.6; the melting point was 172° C.; and the end of melting point was 194° C.

Reference Example 7

Polymerization reaction was carried out in the same manner as in Reference Example 1 except that 0.02 part of stannous acetate and 0.13 part of methanesulfonic acid were used as the polymerization reaction catalyst, to obtain poly-L-lactic acid (PLA7). The weight average molecular weight of PLA7 was 19,000; the polydispersity was 1.5; the melting point was 150° C.; and the end of melting point was 164° C.

Reference Example 8

PLA7 obtained in Reference Example 7 was subjected to crystallization treatment under a nitrogen atmosphere at 110° C. for 1 hour, and then to solid-phase polymerization under a pressure of 60 Pa at 140° C. for 3 hours, at 150° C. for 3 hours and then at 160° C. for 12 hours, to obtain poly-L-lactic acid (PLA8). The weight average molecular weight of PLA8 was 140,000; the polydispersity was 1.8; the melting point was 169° C.; and the end of melting point was 189° C.

Reference Example 9

PLA7 obtained in Reference Example 7 was subjected to crystallization treatment under a nitrogen atmosphere at 110° C. for 1 hour, and then to solid-phase polymerization under a pressure of 60 Pa at 140° C. for 3 hours, at 150° C. for 3 hours and then at 160° C. for 12 hours, to obtain poly-L-lactic acid (PLA9). The weight average molecular weight of PLA9 was 221,000; the polydispersity was 1.8; the melting point was 170° C.; and the end of melting point was 191° C.

Reference Example 10

In a reaction vessel equipped with an agitator and a reflux condenser, 50 parts of 90% aqueous D-lactic acid solution was placed, and the temperature was adjusted to 150° C., followed by allowing the reaction to proceed while gradually decreasing the pressure to evaporate water for 3.5 hours. Thereafter, the pressure was adjusted to normal pressure under a nitrogen atmosphere, and 0.02 part of stannous acetate was added, followed by allowing polymerization reaction to proceed while gradually decreasing the pressure to 13 Pa at 170° C. for 7 hours, to obtain poly-D-lactic acid (PDA1). The weight average molecular weight of PDA1 was 15,000; the polydispersity was 1.5; the melting point was 147° C.; and the end of melting point was 163° C.

Reference Example 11

PDA1 obtained in Reference Example 10 was subjected to crystallization treatment under a nitrogen atmosphere at 110° C. for 1 hour, and then to solid-phase polymerization under a pressure of 60 Pa at 140° C. for 3 hours, at 150° C. for 3 hours and then at 160° C. for 3 hours, to obtain poly-D-lactic acid (PDA2). The weight average molecular weight of PDA2 was 29,000; the polydispersity was 1.6; the melting point was 150° C.; and the end of melting point was 168° C.

Reference Example 12

PDA1 obtained in Reference Example 10 was subjected to crystallization treatment under a nitrogen atmosphere at 110°

C. for 1 hour, and then to solid-phase polymerization under a pressure of 60 Pa at 140° C. for 3 hours, at 150° C. for 3 hours and then at 160° C. for 6 hours, to obtain poly-D-lactic acid (PDA3). The weight average molecular weight of PDA3 was 42,000; the polydispersity was 1.6; the melting point was 158° C.; and the end of melting point was 176° C.

Reference Example 13

PDA1 obtained in Reference Example 10 was subjected to crystallization treatment under a nitrogen atmosphere at 110° C. for 1 hour, and then to solid-phase polymerization under a pressure of 60 Pa at 140° C. for 3 hours, at 150° C. for 3 hours and then at 160° C. for 18 hours, to obtain poly-D-lactic acid (PDA4). The weight average molecular weight of PDA4 was 198,000; the polydispersity was 2.0; the melting point was 170° C.; and the end of melting point was 191° C.

Reference Example 14

Water was distilled from 1 kg of 90 wt % aqueous D-lactic acid solution by stirring the solution at 150° C. at 4,000 Pa for 6 hours, to achieve oligomerization. To this oligomer, 0.2 g of tin(II) chloride and 0.2 g of p-toluenesulfonic acid were added, and melt polymerization was carried out at 180° C. at 1,300 Pa for 3 hours, to obtain poly-D-lactic acid (PDA5). The weight average molecular weight of PDA5 was 16,000; the polydispersity was 1.5; the melting point was 144° C.; and the end of melting point was 160° C.

Reference Example 15

Polymerization reaction was carried out in the same manner as in Reference Example 10 except that 0.02 part of stannous acetate and 0.13 part of methanesulfonic acid were used as the polymerization reaction catalyst, to obtain poly-D-lactic acid (PDA6). The weight average molecular weight of PDA6 was 16,000; the polydispersity was 1.5; the melting point was 149° C.; and the end of melting point was 162° C.

Reference Example 16

PDA6 obtained in Reference Example 15 was subjected to crystallization treatment under a nitrogen atmosphere at 110° C. for 1 hour, and then to solid-phase polymerization under a pressure of 60 Pa at 140° C. for 3 hours, at 150° C. for 3 hours and then at 160° C. for 3 hours, to obtain poly-D-lactic acid (PDA7). The weight average molecular weight of PDA7 was 31,000; the polydispersity was 1.6; the melting point was 152° C.; and the end of melting point was 170° C.

Reference Example 17

PDA6 obtained in Reference Example 15 was subjected to crystallization treatment under a nitrogen atmosphere at 110° C. for 1 hour, and then to solid-phase polymerization under a pressure of 60 Pa at 140° C. for 3 hours, at 150° C. for 3 hours and then at 160° C. for 6 hours, to obtain poly-D-lactic acid (PDA8). The weight average molecular weight of PDA8 was 50,000; the polydispersity was 1.6; the melting point was 160° C.; and the end of melting point was 177° C.

Reference Example 18

PDA6 obtained in Reference Example 15 was subjected to crystallization treatment under a nitrogen atmosphere at 110° C. for 1 hour, and then to solid-phase polymerization under a pressure of 60 Pa at 140° C. for 3 hours, at 150° C. for 3 hours and then at 160° C. for 18 hours, to obtain poly-D-lactic acid (PDA9). The weight average molecular weight of PDA9 was 204,000; the polydispersity was 2.0; the melting point was 172° C.; and the end of melting point was 193° C.

Examples 1 to 12, Comparative Examples 1 to 5

(1) Step of Mixing Poly-L-Lactic Acid and Poly-D-Lactic Acid

Poly-L-lactic acid and poly-D-lactic acid were mixed using a twin screw extruder Type TEX30 (L/D=45.5) manufactured by The Japan Steel Works, LTD.

Poly-L-lactic acid and poly-D-lactic acid were preliminarily subjected to crystallization treatment under a nitrogen atmosphere at a temperature of 110° C. for 2 hours, and, when poly-L-lactic acid and poly-D-lactic acid were supplied to the twin screw extruder, the poly-L-lactic acid or the poly-D-lactic acid having a higher molecular weight was fed from the resin hopper and the other having a lower molecular weight was fed from the side resin hopper provided at the position of L/D=30. In the twin screw extruder, a plasticization part set to a temperature of 180° C. was provided at the position of L/D=10 from the resin hopper, and a kneading disk was provided at the portion of L/D=30 to provide a screw that allows shearing. This structure enables mixing under shearing, and poly-L-lactic acid and poly-D-lactic acid were mixed at a mixing temperature of 200° C. under shearing. The combinations of poly-L-lactic acid and poly-D-lactic acid for the mixing were as shown in Table 1. The polymers after mixing were subjected to crystallization treatment at a pressure of 13.3 Pa at 110° C. for 2 hours, and their physical properties were measured.

Based on the results shown in Table 1, the weight average molecular weight upon mixing was as high as not less than 100,000 in Examples 1 to 12 and Comparative Example 5, while the weight average molecular weight was as low as less than 100,000 in Comparative Examples 1 to 4. In terms of the thermal properties upon mixing, an increase in the melting point of the mixture was observed under the conditions in all of Examples 1 to 7 and Comparative Examples 1 to 5. The degree of stereocomplexation was as high as not less than 60% in Examples 1 to 12 and Comparative Examples 1 to 4, but the degree of stereocomplexation was low in Comparative Example 5, wherein a combination of poly-L-lactic acid and poly-D-lactic acid each having a molecular weight of not less than 100,000 was mixed.

(2) Step of Subjecting Mixture of Poly-L-Lactic Acid and Poly-D-Lactic Acid to Solid-Phase Polymerization The mixture obtained in (1) was subjected to solid-phase polymerization in a vacuum drier at 140° C. at a pressure of 13.3 Pa for 4 hours. Subsequently, the temperature was increased to 150° C. and solid-phase polymerization was carried out for 4 hours, and the temperature was further increased to 160° C. and solid-phase polymerization was carried out for 10 hours.

As shown in Table 1, the molecular weight increased after solid-phase polymerization to as high as not less than 100,000 in all of Examples 1 to 12 (SB1 to SB12) and Comparative Example 5 (SB17). Further, since the polydispersity after solid-phase polymerization was lower than the polydispersity upon mixing and less than 3.0, it could be confirmed that the polymerization proceeded and polylactic acid block copolymer was obtained. In contrast, in Comparative Examples 1 to 4 (SB13 to SB16), the molecular weight after solid-phase polymerization was not more than 100,000. The yield after solid-phase polymerization was as high as not less than 90% in Examples 1 to 12 (SB1 to SB12) and Comparative Examples 1 to 3 (SB13 to SB15) and 5 (SB17), wherein high-molecular-weight segments were used as the polylactic acids to be mixed, but the yield after solid-phase polymerization was as low as less than 90% in Comparative Example 4 (SB16), wherein a combination of poly-L-lactic acid and poly-D-lactic acid each having a molecular weight of as low as not more than 100,000 was mixed. In terms of the thermal properties after solid-phase polymerization, an increase in the melting point of the mixture was observed under the conditions in all of Examples 1 to 12 (SB1 to 12) and Comparative Examples 1 to 5 (SB13 to SB17). The degree of stereocomplexation was as high as not less than 80% in Examples 1 to 12 (SB1 to SB12) and Comparative Examples 1 to 4 (SB13 to SB16), but the degree of stereocomplexation was low in Comparative Example 5 (SB17). The cooling crystallization temperature was not less than 130° C. in Examples 1 to 12 (SB1 to SB12) and Comparative Example 4 (SB16), but was as low as less than 130° C. in Comparative Examples 1 to 3 (SB13 to SB15) and 5 (SB17).

Comparative Example 6

(1) Step of Mixing Poly-L-Lactic Acid and Poly-D-Lactic Acid

In a 200-cc flask, 30 g of PLA6 and 30 g of PDA5 were blended at normal pressure under heat, and the temperature was increased from room temperature to 190° C. for 10 minutes. In the heating process, partial melting was observed at 160° C. Thereafter, the temperature was decreased to obtain a mixture.

As shown by the results in Table 1, the weight average molecular weight upon mixing was 84,000. In terms of the thermal properties upon mixing, an increase in the melting point due to stereocomplex formation was partially observed. However, since blending in the mixing step was carried out at a temperature of not more than the end of melting point of PLA6, the polymer only partially melted and crystals of the polylactic acid alone remained, resulting in a degree of stereocomplexation of as low as 26%.

(2) Step of Subjecting Mixture of Poly-L-Lactic Acid and Poly-D-Lactic Acid to Solid-Phase Polymerization The mixture obtained in (1) was subjected to heat treatment at a pressure of 66.6 Pa at 110° C. for 2 hours, and then heated at 130° C. for 5 hours and at 140° C. for 25 hours (30 hours in total), to perform solid-phase polymerization.

As shown by the results in Table 1, the molecular weight after solid-phase polymerization was 151,000, but the yield after solid-phase polymerization was as low as not more than 90%. In terms of the thermal properties after solid-phase polymerization, an increase in the melting point due to stereocomplex formation was observed, and the degree of stereocomplexation was also high. However, the cooling crystallization temperature after solid-phase polymerization was 124° C., which was lower than the temperatures of not less than 130° C. observed in Examples.

Subsequently, the mixtures obtained in Examples 1 and 2, and Comparative Example 6 (SC1, SC2 and SC18); and the polymers obtained by solid-phase polymerization of these three kinds of mixtures (SB1, SB2 and SB18); were subjected to measurement of variation of the crystallization properties. That is, when the degrees of stereocomplexation of 20 pellets were compared, Examples 1 and 2 showed differences of not more than 5%, while Comparative Example 6 showed a difference of 15%.

Comparative Example 7

(1) Step of Mixing Poly-L-Lactic Acid and Poly-D-Lactic Acid

Poly-L-lactic acid and poly-D-lactic acid were mixed in the same manner as in Example 1.

Subsequently, a glass container was tightly filled with the mixture of poly-L-lactic acid and poly-D-lactic acid and the container was tightly closed, followed by heating the container. The heating temperature and time were the same as in Example 1.

Simply heating the mixture did not allow solid-phase polymerization to proceed, and the weight average molecular weight of the SB19 sample after heating was 81,000, which was lower than in Example 1. The yield of this SB19 sample was 98% and the polydispersity was 2.7. The melting point was 162° C./215° C., and it was therefore considered that stereocomplex formation increased the melting point. However, the cooling crystallization temperature was 112° C., which was lower than in Example 1 in which solid-phase polymerization was carried out under reduced pressure.

TABLE 1

| | Raw Material PLLA, PDLA (Mw × 10⁴) | Mixture | Mixing composition ratio of L/D wt/wt | L/D molecular weight ratio | Mw × 10⁴ | Polydipersity | Melting point of mixture (° C.) | Sc (%) |
|---|---|---|---|---|---|---|---|---|
| Example 1 | PLA4(20.3) PDA2(2.9) | SC1 | 50/50 | 7.0 | 11.0 | 3.2 | 161/216 | 98 |
| Example 2 | PLA4(20.3) PDA2(2.9) | SC2 | 70/30 | 7.0 | 13.7 | 3.0 | 162/214 | 75 |
| Example 3 | PLA5(26.2) PDA1(1.5) | SC3 | 50/50 | 17.7 | 12.3 | 3.5 | 213 | 100 |
| Example 4 | PLA5(26.2) PDA1(1.5) | SC4 | 70/30 | 17.7 | 15.8 | 3.2 | 157/216 | 86 |
| Example 5 | PLA1(1.8) PDA4(19.8) | SC5 | 50/50 | 11.0 | 11.1 | 3.3 | 211 | 100 |
| Example 6 | PLA1(1.8) PDA4(19.8) | SC6 | 30/70 | 11.0 | 13.1 | 2.8 | 162/213 | 78 |

TABLE 1-continued

| | Raw Material PLLA, PDLA (Mw × 10⁴) | Polymer | | | | Melting point (°C) | Sc (%) |
|---|---|---|---|---|---|---|---|
| Example 7 | PLA3(13.7) PDA3(4.2) | SC7 | 70/30 | 3.3 | 10.3 | 2.3 | 161/212 | 79 |
| Example 8 | PLA9(22.1) PDA7(3.1) | SC8 | 50/50 | 7.1 | 12.3 | 3.4 | 162/214 | 96 |
| Example 9 | PLA9(22.1) PDA7(3.1) | SC9 | 70/30 | 7.1 | 14.2 | 2.9 | 161/212 | 72 |
| Example 10 | PLA7(1.9) PDA9(20.4) | SC10 | 50/50 | 10.7 | 11.6 | 3.2 | 158/213 | 98 |
| Example 11 | PLA7(1.9) PDA9(20.4) | SC11 | 30/70 | 10.7 | 13.9 | 2.8 | 159/211 | 80 |
| Example 12 | PLA8(14.0) PDA8(5.0) | SC12 | 70/30 | 2.8 | 11.8 | 2.3 | 162/213 | 76 |
| Comparative Example 1 | PLA4(20.3) PDA2(2.9) | SC13 | 30/70 | 7.0 | 7.2 | 3.3 | 159/213 | 81 |
| Comparative Example 2 | PLA5(26.2) PDA1(1.5) | SC14 | 30/70 | 17.7 | 6.9 | 3.6 | 155/214 | 89 |
| Comparative Example 3 | PLA1(1.8) PDA4(19.8) | SC15 | 70/30 | 11.0 | 6.5 | 2.9 | 163/212 | 83 |
| Comparative Example 4 | PLA2(4.3) PDA3(4.2) | SC16 | 50/50 | 1.0 | 4.0 | 2.2 | 210 | 100 |
| Comparative Example 5 | PLA5(26.2) PDA4(19.8) | SC17 | 50/50 | 1.3 | 19.2 | 2.3 | 170/208 | 45 |
| Comparative Example 6 | PLA6(15.4) PDA5(1.6) | SC18 | 50/50 | 9.6 | 8.4 | 3.3 | 155/208 | 26 |
| Comparative Example 7 | PLA4(20.3) PDA2(2.9) | SC1 | 50/50 | 7.0 | 11.0 | 3.2 | 161/216 | 98 |

| | | Polymer after solid-phase polymerization (poly lactic acid block copolymer) | | | | | |
|---|---|---|---|---|---|---|---|
| | Raw Material PLLA, PDLA (Mw × 10⁴) | Polymer | Mw × 10⁴ | Poly-dispersity | Yield (%) | Melting point after solid-phase polymerization (°C) | Sc (%) | Cooling crystallization temperature (°C) |
| Example 1 | PLA4(20.3) PDA2(2.9) | SB1 | 12.5 | 2.6 | 97 | 219 | 100 | 137 |
| Example 2 | PLA4(20.3) PDA2(2.9) | SB2 | 15.8 | 2.0 | 95 | 171/221 | 94 | 133 |
| Example 3 | PLA5(26.2) PDA1(1.5) | SB3 | 13.3 | 2.7 | 96 | 212 | 100 | 139 |
| Example 4 | PLA5(26.2) PDA1(1.5) | SB4 | 16.9 | 2.1 | 96 | 170/222 | 96 | 135 |
| Example 5 | PLA1(1.8) PDA4(19.8) | SB5 | 13.0 | 2.9 | 95 | 214 | 100 | 136 |
| Example 6 | PLA1(1.8) PDA4(19.8) | SB6 | 15.5 | 2.3 | 92 | 169/223 | 94 | 131 |
| Example 7 | PLA3(13.7) PDA3(4.2) | SB7 | 13.6 | 2.0 | 94 | 170/211 | 89 | 134 |
| Example 8 | PLA9(22.1) PDA7(3.1) | SB8 | 13.2 | 2.5 | 96 | 216 | 100 | 138 |
| Example 9 | PLA9(22.1) PDA7(3.1) | SB9 | 16.6 | 2.2 | 98 | 172/217 | 98 | 140 |
| Example 10 | PLA7(1.9) PDA9(20.4) | SB10 | 12.0 | 2.7 | 96 | 213 | 100 | 139 |
| Example 11 | PLA7(1.9) PDA9(20.4) | SB11 | 15.1 | 2.3 | 94 | 170/212 | 97 | 132 |
| Example 12 | PLA8(14.0) PDA8(5.0) | SB12 | 14.3 | 1.9 | 95 | 171/215 | 91 | 132 |
| Comparative Example 1 | PLA4(20.3) PDA2(2.9) | SB13 | 8.3 | 2.4 | 92 | 170/214 | 96 | 115 |
| Comparative Example 2 | PLA5(26.2) PDA1(1.5) | SB14 | 7.2 | 2.6 | 91 | 169/210 | 95 | 122 |
| Comparative Example 3 | PLA1(1.8) PDA4(19.8) | SB15 | 7.7 | 2.5 | 93 | 170/211 | 96 | 120 |
| Comparative Example 4 | PLA2(4.3) PDA3(4.2) | SB16 | 4.2 | 2.1 | 78 | 209 | 100 | 134 |
| Comparative Example 5 | PLA5(26.2) PDA4(19.8) | SB17 | 18.2 | 2.2 | 93 | 169/208 | 40 | 105 |
| Comparative Example 6 | PLA6(15.4) PDA5(1.6) | SB18 | 15.1 | 2.9 | 76 | 171/213 | 93 | 124 |
| Comparative Example 7 | PLA4(20.3) PDA2(2.9) | — | — | — | — | — | — | — |

Reference Example 19

In a reaction vessel equipped with an agitator, 100 parts of L-lactide and 0.05 part of ethylene glycol were uniformly melted under a nitrogen atmosphere at 150° C. Thereafter, 0.003 part of stannous octoate was added and polymerization reaction was performed for 3 hours. After the polymerization reaction, the reaction product was dissolved in chloroform, and monomers were completely removed by allowing precipitation with stirring in methanol (5 times the amount of chloroform), to obtain poly-L-lactic acid (PLA10). The weight average molecular weight of PLA10 was 201,000; the polydispersity was 1.7; the melting point was 173° C.; and the end of melting point was 190° C.

Reference Example 20

In a reaction vessel equipped with an agitator, 100 parts of L-lactide and 0.1 part of ethylene glycol were uniformly melted under a nitrogen atmosphere at 150° C. Thereafter, 0.003 part by weight of stannous octoate was added and polymerization reaction was performed for 3 hours. Subsequently, 0.01 part of a phosphorus catalyst deactivating agent was added to the reaction system and the resulting mixture was stirred for 10 minutes to perform catalyst deactivation. The obtained reaction product was dissolved in chloroform, and monomers were completely removed by allowing precipitation with stirring in methanol (5 times the amount of chloroform), to obtain poly-L-lactic acid (PLA11). The weight average molecular weight of PLA11 was 122,000; the polydispersity was 1.7; the melting point was 170° C.; and the end of melting point was 188° C.

Reference Example 21

In a reaction vessel equipped with an agitator, 100 parts of D-lactide was uniformly melted under a nitrogen atmosphere at 160° C. Thereafter, 0.003 part of stannous octoate was added and polymerization reaction was performed for 6 hours. After the polymerization reaction, the reaction product was dissolved in chloroform, and monomers were completely removed by allowing precipitation with stirring in methanol (5 times the amount of chloroform), to obtain poly-D-lactic acid (PDA10). The weight average molecular weight of PDA10 was 1,300,000; the polydispersity was 1.6; the melting point was 180° C.; and the end of melting point was 194° C., Reference Example 22

In a reaction vessel equipped with an agitator, 100 parts of D-lactide and 0.05 part of ethylene glycol were uniformly melted under a nitrogen atmosphere at 150° C. Thereafter, 0.003 part of stannous octoate was added and polymerization reaction was performed for 3 hours. After the polymerization reaction, the reaction product was dissolved in chloroform, and monomers were completely removed by allowing precipitation with stirring in methanol (5 times the amount of chloroform), to obtain poly-D-lactic acid (PDA11). The weight average molecular weight of PDA11 was 198,000; the polydispersity was 1.7; the melting point was 172° C.; and the end of melting point was 190° C.

Reference Example 23

In a reaction vessel equipped with an agitator, 100 parts of D-lactide and 0.1 part of ethylene glycol were uniformly melted under a nitrogen atmosphere at 150° C. Thereafter, 0.003 part of stannous octoate was added and polymerization reaction was performed for 3 hours. Subsequently, 0.01 part of a phosphorus catalyst deactivating agent was added to the reaction system and the resulting mixture was stirred for 10 minutes, to perform catalyst deactivation. The obtained reaction product was dissolved in chloroform, and monomers were completely removed by allowing precipitation with stirring in methanol (5 times the amount of chloroform), to obtain poly-D-lactic acid (PDA12). The weight average molecular weight of PDA12 was 120,000; the polydispersity was 1.7; the melting point was 169° C.; and the end of melting point was 188° C.

Comparative Examples 8, 9, 11 and 12

(1) Step of Mixing Poly-L-Lactic Acid and Poly-D-Lactic Acid

Poly-L-lactic acid and poly-D-lactic acid were mixed using a batch-type twin screw extruder (Labo Plastomill) manufactured by Toyo Seiki Co., Ltd. to obtain a polylactic acid mixture. The test conditions were as follows: kneading temperature, 245° C.; kneading rotation speed, 120 rpm; kneading time, 10 minutes (Comparative Examples 8 and 11) or 60 minutes (Comparative Examples 9 and 12). The combinations of poly-L-lactic acid and poly-D-lactic acid were as shown in Table 2.

The weight average molecular weight of the polylactic acid mixture was as high as not less than 100,000 in Comparative Example 8 (SC14) and Comparative Example 11 (SC17), but Comparative Example 9 (SC15) and Comparative Example 12 (SC18), in each of which the kneading time was as long as 60 minutes, tended to show decreased average molecular weights of as low as not more than 100,000. The melting point of the polylactic acid mixture observed was not less than 200° C. due to formation of stereocomplexes in all the cases, but the degrees of stereocomplexation in Comparative Examples 8 and 11 were not more than 60%, which were lower than in Examples 1 to 8. The cooling crystallization temperatures of the polylactic acid mixtures observed were 105° C. and 125° C. in Comparative Examples 9 and 12, respectively, in which the kneading time was long. However, the cooling crystallization temperature could not be observed in Comparative Examples 8 and 11, and both of these samples had low crystallization properties.

Comparative Examples 10 and 13

(1) Step of Mixing Poly-L-Lactic Acid and Poly-D-Lactic Acid

A polylactic acid mixture was prepared by kneading poly-L-lactic acid and poly-D-lactic acid using a batch-type twin screw extruder under the same conditions as in Comparative Examples 9 and 12 for 60 minutes and then adding 10 parts by weight of a plasticizer, followed by further kneading the resulting mixture for 5 minutes. The combinations of poly-L-lactic acid, poly-D-lactic acid and the plasticizer were as shown in Table 2.

As shown in Table 2, the weight average molecular weights of the polylactic acid mixtures in Comparative Example 10 (SC16) and Comparative Example 13 (SC19) were 84,000 and 51,000, respectively, and the molecular weight tended to be low due to kneading for a long time as in the cases of Comparative Examples 9 and 12. On the other hand, in terms of the thermal properties of the molded product, the polylactic acid mixtures in Comparative Example 10 (SC16) and Comparative Example 13 (SC19) had cooling crystallization temperatures of 103° C. and 120° C., respectively, which were almost the same as in Comparative Example 9 (SC15) and Comparative Example 12 (SC18).

Comparative Examples 14 to 17

(1) Step of Mixing Poly-L-Lactic Acid and Poly-D-Lactic Acid

Mixtures of Poly-L-lactic acid and poly-D-lactic acid were prepared by kneading using a twin screw extruder in the same manner as in Examples 1 to 12. All of poly-L-lactic acid, poly-D-lactic acid and the nuclear agent were fed to the twin screw extruder from the resin hopper, and the kneading temperature was set to 240° C. for carrying out kneading. The combinations of poly-L-lactic acid, poly-D-lactic acid and the nuclear agent were as shown in Table 2.

The polylactic acid mixtures obtained by kneading had weight average molecular weights of 110,000 to 120,000 in Comparative Examples 14 to 16 (SC20 to SC22), but the molecular weight in Comparative Example 17 (SC23) was 65,000 and tended to be low. The melting points of the polylactic acid mixtures observed were not less than 200° C. due to stereocomplex formation, but the cooling crystallization temperatures of the polylactic acid mixtures could be observed only in the cases of Comparative Examples 14 to 16 (SC20 to SC22), wherein a nuclear agent was used in combination.

The values of various physical properties measured by sampling the central portion of the sheet-shaped molded product were as shown in Table 3. In any of Examples 13 to 24 and Comparative Examples 18 to 24, the relative degree of crystallinity of the sheet-shaped molded product was 100%. The haze value was measured for the sample prepared by cutting out a piece having a size of 5 cm×5 cm from the central portion of the sheet-shaped molded product, and, as a result, it was found that the sheet-shaped molded products in Examples 13 to 24 have haze values of less than 10% and are excellent in transparency. On the other hand, the haze values of the sheet-shaped molded products of Comparative Examples 18 to 24 were not less than 10% except for the sheet-shaped molded product of Comparative Example 21, which had a haze value of less than 10%.

Subsequently, the central portion of each sheet-shaped molded product was cut into a piece having a size of 40 mm×2

TABLE 2

| | Raw material | | | | | | | | Mixture of poly-L-lactic acid & poly-D-lactic acid | | | | |
|---|---|---|---|---|---|---|---|---|---|---|---|---|---|
| | Polymer | | | Nuclear agent | | Plasticizer | | | | | | Melting | Cooling crystalliza- |
| | PLLA, PDLA (Mw × 10⁴) | Mixing composition ratio of L/D wt/wt | L/D molecular weight ratio | Type | Parts by weight | Type | Parts by weight | Mixture | Mw × 10⁴ | Poly-dispersity | point of mixture (° C.) | Sc (%) | tion temperature (° C.) |
| Comparative Example 8 | PLA7(20.1) PDA6(130) | 50/50 | 6.5 | | 100 | | | SC19 | 27.5 | 1.7 | 173/215 | 42 | ND |
| Comparative Example 9 | PLA7(20.1) PDA6(130) | 50/50 | 6.5 | | 100 | | | SC20 | 8.1 | 1.6 | 213 | 100 | 105 |
| Comparative Example 10 | PLA7(20.1) PDA6(130) | 50/50 | 6.5 | | 90 | P1 | 10 | SC21 | 7.2 | 1.6 | 212 | 100 | 103 |
| Comparative Example 11 | PLA7(20.1) PDA7(19.8) | 50/50 | 1.0 | | 100 | | | SC22 | 10.8 | 1.7 | 172/219 | 58 | ND |
| Comparative Example 12 | PLA7(20.1) PDA7(19.8) | 50/50 | 1.0 | | 100 | | | SC23 | 5.1 | 1.6 | 212 | 100 | 125 |
| Comparative Example 13 | PLA7(20.1) PDA7(19.8) | 50/50 | 1.0 | | 90 | P1 | 10 | SC24 | 5.0 | 1.6 | 211 | 100 | 120 |
| Comparative Example 14 | PLA8(12.2) PDA8(12.0) | 50/50 | 1.0 | | 100 | | | SC25 | 11.3 | 1.7 | 169/211 | 52 | ND |
| Comparative Example 15 | PLA8(12.2) PDA8(12.0) | 50/50 | 1.0 | N1 | 100 | 1 | | SC26 | 11.2 | 1.7 | 170/213 | 73 | 118 |
| Comparative Example 16 | PLA8(12.2) PDA8(12.0) | 50/50 | 1.0 | N2 | 100 | 1 | | SC27 | 10.8 | 1.7 | 169/210 | 71 | 115 |
| Comparative Example 17 | PLA8(12.2) PDA8(12.0) | 50/50 | 1.0 | N3 | 100 | 1 | | SC28 | 6.5 | 1.7 | 168/211 | 90 | 130 |

Nuclear agent
N1: ethylene-bis-lauric acid amide ("Slipacks L" manufactured by Nippon Kasei Chemical Co., Ltd.).
N2: Phosphate ester sodium salt ("NA-11" manufactured by ADEKA CORPORATION).
N3: Phosphate ester aluminum salt ("NA-71" manufacutured by ADEKA CORPORATION)
Plasticizer
P1: Polyglyceryl fatty acid ester ("Chirabazol" manufactured by Taiyo Kagaku Co., Ltd.)

Examples 13 to 24, Comparative Examples 18 to 24

As shown in Table 3, the polylactic acid block copolymers obtained in Examples 1 to 12 and Comparative Examples 1 to 6 (SB1 to SB12 and SB13 to SB18) and the polylactic acid mixture obtained in Comparative Example 7 (SB19) were subjected to melt mixing using a twin screw extruder with 0.05 part of a phosphorus catalyst deactivating agent at 240° C. to perform catalyst deactivation. Subsequently, the mixture was melted by heating at 240° C. for 2 minutes, and pressed at a pressing temperature of 80° C. to prepare a pressed sheet having a thickness of 0.1 mm. Thereafter, the pressed sheet was subjected to heat treatment under a nitrogen atmosphere under the heat treatment conditions of 110° C. for 30 minutes, to prepare a sheet-shaped molded product for various kinds of measurement.

mm to provide a strip-shaped sample, and the sample was subjected to measurement of the storage modulus at 130° C. according to viscoelasticity. As a result, any of the sheet-shaped molded products of Examples 13 to 24 had a storage modulus of not less than 2 GPa, and was excellent in heat resistance. Measurement of the tensile strength of the strip-shaped samples revealed that any of these has a value of not less than 60 MPa. On the other hand, in terms of the sheet-shaped molded products of Comparative Examples 18 to 24, the storage modulus at 130° C. was not less than 2 GPa in Comparative Examples 21, 23 and 24, but was less than 2 GPa in the other cases. In terms of the tensile strength of the strip-shaped samples, all these sheet-shaped molded products showed a value of less than 60 MPa, having lower physical properties than in the Examples.

Subsequently, each sheet-shaped molded product was heated using a vacuum forming machine under the conditions of a heating temperature of 100° C. and heating time of 60 seconds, and brought into close contact with a metal mold at a mold temperature of 40° C. while the pressure inside the metal mold was reduced, to obtain a cylindrical container having an inner diameter of 6 cm and a depth of 10 cm. This cylindrical container was subjected to heat treatment under a nitrogen atmosphere under the heat treatment conditions of 110° C. for 30 minutes. The container was then filled with water and the lid was closed. Thereafter, the container was dropped onto concrete from a height of 2 m with its bottom facing downward, and the number of times of this operation was counted until the container was broken due to the drop impact to cause leakage of water. As a result, all of the samples of Examples 13 to 24 were confirmed to have good impact resistance. In contrast, in terms of the samples of Comparative Examples 18 to 24, breakage of the container and leakage of water were observed after less than 5 times of the dropping.

Example 25

The polylactic acid block copolymer SB1 obtained by solid-phase polymerization in Example 1 was subjected to catalyst deactivation before preparation of a sheet-shaped molded product. The method of catalyst deactivation was the same as in Examples 13 to 24. Subsequently, the polylactic acid block copolymer subjected to catalyst deactivation was melted by heating at 240° C. for 2 minutes, and then pressed at a press temperature of 80° C. to prepare a press sheet having a thickness of 0.1 mm, followed by cooling the sheet in ice water, to provide a sheet-shaped molded product for various kinds of measurement. The methods of measurement of various kinds of physical properties of the sheet-shaped molded product were the same as in Examples 13 to 24.

As shown in Table 3, the relative degree of crystallinity of the sheet-shaped molded product of Example 25 was as low as 10% since heat treatment of the molded product was not carried out. Further, the haze value of the sheet-shaped molded product was 2% since heat treatment was not carried out, and the transparency was high. However, the tensile strength and impact resistance of the sheet-shaped molded product were lower than those in Examples 13 to 24, and the storage modulus at 130° C. could not be measured because the molded product was broken in the process of temperature increase during the measurement.

Comparative Example 25

The polylactic acid mixture SC1 obtained in Example 1 was subjected to catalyst deactivation before preparation of a sheet-shaped molded product. The method of catalyst deactivation was the same as in Examples 13 to 24. Subsequently, a molded product for measuring various kinds of physical properties was prepared using the SC1 after the catalyst deactivation. The method of preparation of the molded product and the methods of measurement of physical properties were the same as in Examples 13 to 24.

As shown in Table 3, the relative degree of crystallinity of the sheet-shaped molded product of Comparative Example 25 was 100%. The sheet-shaped molded product had a haze value of the molded product of 14%, showing high transparency. The storage modulus of the sheet-shaped molded product at 130° C. was as high as 2.4 GPa, but the tensile strength and the impact resistance were inferior to those of Examples 13 to 24.

Comparative Examples 26, 27, 29 and 30

The polylactic acid mixtures obtained in Comparative Examples 8, 9, 11 and 12 (SC19, SC20, SC22 and SC23) were subjected to catalyst deactivation before preparation of sheet-shaped molded products. The method of catalyst deactivation was the same as in Examples 13 to 24. Subsequently, a molded product for measuring various kinds of physical properties was prepared using each of the polylactic acid mixtures after the catalyst deactivation. The method of preparation of the molded products for measuring various kinds of physical properties and the methods of measurement of physical properties were the same as in Examples 13 to 24.

As shown in Table 3, in terms of the relative degrees of crystallinity of the sheet-shaped molded products of Comparative Examples, Comparative Examples 27, 29 and 30 each showed a value of 100%, but Comparative Example 26 showed a value of as low as 78%. In terms of the haze values of the sheet-shaped molded products, Comparative Example 31 showed a value of 22%, but Comparative Examples 26, 27 and 29 showed values of not less than 40%, having lower transparency compared to Examples 13 to 24. Further, the storage moduli of the sheet-shaped molded products at 130° C. were not more than 2 GPa, indicating lower rigidity at high temperature.

In terms of the tensile strength and the impact resistance of the sheet-shaped molded products, Comparative Example 26, wherein the molecular weight of the molded product was high, showed excellent values, but Comparative Examples 28, 30 and 31 showed lower values compared to Examples 13 to 24.

Comparative Examples 28 and 31

The polylactic acid mixtures obtained in Comparative Examples 10 and 13 (SC21 and SC24) were subjected to catalyst deactivation before preparation of sheet-shaped molded products. The method of catalyst deactivation was the same as in Examples 13 to 24. Subsequently, a molded product for measuring various kinds of physical properties was prepared using each of the polylactic acid mixtures after the catalyst deactivation. The method of preparation of the molded products for measuring various kinds of physical properties and the methods of measurement of physical properties were the same as in Examples 13 to 24. As shown in Table 3, the relative degree of crystallinity of the sheet-shaped molded product was 100% in both Comparative Examples. The haze value of the molded product was lower than in Comparative Examples 23 and 25 due to addition of the plasticizer, resulting in improved transparency, but the tensile strength of the molded products tended to be low due to addition of the plasticizer.

Comparative Examples 32 to 36

The polylactic acid obtained in Reference Example 20 (PLA11) and the polylactic acid mixtures obtained in Comparative Examples 14 to 17 (SC25 to SC28) were subjected to catalyst deactivation before preparation of sheet-shaped molded products. The method of catalyst deactivation was the same as in Examples 13 to 24. Subsequently, a molded product for measuring various kinds of physical properties was prepared using each of the polylactic acid mixtures after the catalyst deactivation.

As shown in Table 3, the relative degree of crystallinity of the sheet-shaped molded product of any of the Comparative Examples was 100%. In terms of the haze values of the molded products, Comparative Examples 32 and 33 showed values of not less than 50%, having low transparency, and Comparative Examples 34 to 36 showed values of as low as 13 to 15% due to combined use of a nuclear agent. In terms of the mechanical properties of the molded products, any of the products showed lower values compared to Examples 13 to 24, and both the tensile strength and the impact resistance tended to be even lower in Comparative Example 36, wherein the molecular weight was especially low.

Thus, the polylactic acid block copolymers obtained by our production method had excellent heat resistance, crystallinity and transparency also in molded products.

TABLE 3

| | Polymer type | Relative degree of crystallinity (%) | 0.1 mm thick Haze (%) | 130° C. storage modulus (Gpa) | Tensile strength (Mpa) | Impact resistance Drop test |
|---|---|---|---|---|---|---|
| Example 13 | SB1 | 100 | 1 | 3.0 | 70 | A |
| Example 14 | SB2 | 100 | 3 | 2.3 | 68 | A |
| Example 15 | SB3 | 100 | 2 | 3.1 | 72 | A |
| Example 16 | SB4 | 100 | 4 | 2.4 | 71 | A |
| Example 17 | SB5 | 100 | 2 | 2.9 | 67 | A |
| Example 18 | SB6 | 100 | 5 | 2.2 | 67 | A |
| Example 19 | SB7 | 100 | 4 | 2.2 | 65 | A |
| Example 20 | SB8 | 100 | 1 | 3.1 | 71 | A |
| Example 21 | SB9 | 100 | 2 | 2.4 | 69 | A |
| Example 22 | SB10 | 100 | 2 | 3.2 | 68 | A |
| Example 23 | SB11 | 100 | 3 | 2.5 | 67 | A |
| Example 24 | SB12 | 100 | 5 | 2.3 | 66 | A |
| Comparative Example 18 | SB13 | 100 | 10 | 1.9 | 54 | B |
| Comparative Example 19 | SB14 | 100 | 15 | 1.7 | 56 | B |
| Comparative Example 20 | SB15 | 100 | 12 | 1.6 | 52 | B |
| Comparative Example 21 | SB16 | 100 | 5 | 2.4 | 41 | F |
| Comparative Example 22 | SB17 | 100 | 45 | 1.6 | 59 | B |
| Comparative Example 23 | SB18 | 100 | 17 | 2.0 | 55 | B |
| Comparative Example 24 | SB19 | 100 | 19 | 2.5 | 51 | B |
| Example 25 | SB1 | 10 | 2 | — | 40 | B |
| Comparative Example 25 | SC1 | 100 | 14 | 2.4 | 42 | B |
| Comparative Example 26 | SC19 | 78 | 76 | 1.6 | 68 | A |
| Comparative Example 27 | SC20 | 100 | 42 | 1.8 | 57 | B |
| Comparative Example 28 | SC21 | 100 | 36 | 1.7 | 55 | B |
| Comparative Example 29 | SC22 | 100 | 45 | 1.9 | 50 | B |
| Comparative Example 30 | SC23 | 100 | 22 | 2.4 | 40 | F |
| Comparative Example 31 | SC24 | 100 | 13 | 1.7 | 35 | B |
| Comparative Example 32 | PLA11 | 100 | 90 | 1.4 | 60 | B |
| Comparative Example 33 | SC25 | 100 | 52 | 1.6 | 58 | B |
| Comparative Example 34 | SC26 | 100 | 15 | 2.5 | 62 | A |
| Comparative Example 35 | SC27 | 100 | 13 | 2.4 | 61 | A |
| Comparative Example 36 | SC28 | 100 | 11 | 2.5 | 48 | F |

INDUSTRIAL APPLICABILITY

By our production method, a polylactic acid block copolymer having a high molecular weight and a high melting point can be obtained, so that the polylactic acid block copolymer can be suitably applied to fields in which use of polylactic acid homopolymers has been difficult because of requirement of heat resistance.

The invention claimed is:

1. A method of producing a polylactic acid block copolymer comprising a segment(s) composed of L-lactic acid units and a segment(s) composed of D-lactic acid units, whose polydispersity represented by a ratio between the weight average molecular weight and the number average molecular weight of the obtained polylactic acid block copolymer is not more than 2.7, and yield after solid-phase polymerization is not less than 90%, the method comprising:
   obtaining a mixture by mixing poly-L-lactic acid and poly-D-lactic acid one of which has a weight average molecular weight of 60,000 to 300,000 and the other of which has a weight average molecular weight of 10,000 to 50,000 with the mixing weight ratio between poly-L-lactic acid composed of L-lactic acid units and poly-D-lactic acid composed of D-lactic acid units of 75:25 to 60:40 or 40:60 to 25:75, by a method wherein poly-L-lactic acid and poly-D-lactic acid are separately supplied via a resin hopper and a side resin hopper in the extruder, said mixture having a weight average molecular weight of not less than 90,000 and a degree of stereocomplexation (Sc) satisfying Inequality (1):

$$Sc = \Delta Hh/(\Delta Hl + \Delta Hh) \times 100 > 72 \text{ to } \leq 80 \qquad (1)$$

(wherein Sc is the degree of stereocomplexation of the resulting mixture immediately before the solid-state polymerization, $\Delta Hh$ represents heat of fusion of stereocomplex crystals (J/g), and $\Delta Hl$ represents heat of fusion of crystals of poly-L-lactic acid alone and crystals of poly-D-lactic acid alone (J/g)); and
   subsequently subjecting said mixture to solid-phase polymerization at a temperature lower than the melting point of said mixture.

2. The method according to claim 1, wherein one of said poly-L-lactic acid and said poly-D-lactic acid as raw materials has a weight average molecular weight of not less than 170,000 and the other has a weight average molecular weight of not less than 20,000.

3. The method according to claim 1, wherein the obtained polylactic acid block copolymer satisfies Inequality (3):

$$Sc = \Delta Hh/(\Delta Hl + \Delta Hh) \times 100 > 80 \qquad (3).$$

4. The method according to claim 1, wherein, in DSC measurement of obtained polylactic acid block copolymer, the cooling crystallization temperature measured by increasing temperature of said polylactic acid block copolymer to 250° C. and keeping the temperature constant for 3 minutes, followed by decreasing the temperature at a cooling rate of 20° C./min. is not less than 130° C.

5. The method according to claim 1, wherein a molded product comprising obtained polylactic acid block copolymer satisfies Inequality (4):

$$\text{Relative degree of crystallinity} = [(\Delta Hm - \Delta Hc)/\Delta Hm] \times 100 > 90 \qquad (4)$$

(wherein $\Delta Hm$ represents melting enthalpy of crystals in a molded product (J/g), and $\Delta Hc$ represents crystallization enthalpy of crystals in the molded product upon temperature increase (J/g)) and has a haze value of not more than 30% when thickness of said molded product is 100 μm.

6. The method according to claim 1, wherein said mixture comprises a catalyst in an amount of 0.001 to 0.5 part by weight with respect to 100 parts by weight of said mixture.

7. The method according to claim 6, wherein said catalyst contained in said mixture is at least one selected from the group consisting of tin compounds, titanium compounds, lead compounds, zinc compounds, cobalt compounds, iron compounds, lithium compounds, rare earth compounds and sulfonic acid compounds.

8. The method according to claim 7, wherein said tin compounds are at least one selected from the group consisting of stannous acetate, stannous octoate, tin(II) chloride and tin (IV) chloride, and said sulfonic acid compounds are at least one selected from the group consisting of methanesulfonic acid, ethanesulfonic acid, propanesulfonic acid, propanedisulfonic acid, naphthalenedisulfonic acid and 2-aminoethanesulfonic acid.

9. The method according to claim 1, wherein temperature during said solid-phase polymerization is increased stepwise or continuously.

10. The method according to claim 1, wherein weight average molecular weight of the polylactic acid block copolymer is not less than 100,000.

* * * * *